United States Patent
Ross et al.

(10) Patent No.: US 11,961,372 B1
(45) Date of Patent: Apr. 16, 2024

(54) SYSTEM AND METHOD FOR PRODUCING NON-REDUNDANT QUICK PICK NUMBER GROUPS FOR AUTOMATED LOTTERY TICKET SELECTION

(71) Applicant: SCA PROMOTIONS, Dallas, TX (US)

(72) Inventors: Jay B. Ross, Delran, NJ (US); Robert Hamman, Dallas, TX (US)

(73) Assignee: SCA PROMOTIONS, Dallas, TX (US)

( * ) Notice: Subject to any disclaimer, the term of this patent is extended or adjusted under 35 U.S.C. 154(b) by 0 days.

(21) Appl. No.: 18/129,776

(22) Filed: Mar. 31, 2023

(51) Int. Cl.
*G07F 17/32* (2006.01)
*G06F 7/58* (2006.01)

(52) U.S. Cl.
CPC ............ *G07F 17/329* (2013.01); *G06F 7/588* (2013.01)

(58) Field of Classification Search
CPC .... G07F 17/329; G07F 17/3223; G07F 7/588; G07C 15/00
See application file for complete search history.

(56) References Cited

U.S. PATENT DOCUMENTS

| | | | |
|---|---|---|---|
| 7,100,822 B2* | 9/2006 | Piper | G07F 17/3288 235/487 |
| 2004/0116176 A1* | 6/2004 | Tulley | G06Q 30/0283 463/17 |
| 2006/0223617 A1* | 10/2006 | Tulley | G07F 17/3234 463/17 |
| 2007/0167214 A1* | 7/2007 | Tulley | G07F 17/3234 463/17 |
| 2021/0043030 A1* | 2/2021 | Nelson | G07F 17/3244 |

* cited by examiner

*Primary Examiner* — David L Lewis
*Assistant Examiner* — Robert E Mosser
(74) *Attorney, Agent, or Firm* — MEAGHER EMANUEL LAKS GOLDBERG & LIAO, LLP

(57) ABSTRACT

At least a method and an apparatus are provided for efficiently generating non-redundant machine-generated quick pick lottery game entries. A computer file is created that includes every possible combination of number groups eligible for being selected for a particular lottery game. The every possible combination within the file is randomly shuffled to create a randomized list of non-redundant entries. A file index with a file index pointer is assigned to the randomized list of non-redundant entries. The file index pointer is set to an initial position in the randomized list of non-redundant entries. Each non-redundant machine-generated lottery game entry is generated by only sequentially incrementing or only sequentially decrementing the file index pointer in the randomized list, and outputting the each non-redundant entry indicated by the file index pointer to a ticket request device.

18 Claims, 32 Drawing Sheets

| Win Level | Condition | Prize |
|---|---|---|
| 0 | No Match on 5 Balls, No Match on Mega Ball | No Prize |
| 1 | No Match on 5 Balls, Match on Mega Ball | Level 1 |
| 2 | 1 of 5 Match, No Match on Mega Ball | No Prize |
| 3 | 1 of 5 Match, Match on Mega Ball | Level 2 |
| 4 | 2 of 5 Match, No Match on Mega Ball | No Prize |
| 5 | 2 of 5 Match, Match on Mega Ball | Level 3 |
| 6 | 3 of 5 Match, No Match on Mega Ball | Level 4 |
| 7 | 3 of 5 Match, Match on Mega Ball | Level 5 |
| 8 | 4 of 5 Match, No Match on Mega Ball | Level 6 |
| 9 | 4 of 5 Match, Match on Mega Ball | Level 7 |
| 10 | 5 of 5 Match, No Match on Mega Ball | Level 8 |
| 11 | 5 of 5 Match, Match on Mega Ball | Level 9 |

Figure 3

| 01 | 02 | 03 | 04 | 05 | 01 |
|----|----|----|----|----|----|
| 01 | 02 | 03 | 04 | 06 | 01 |
| 01 | 02 | 03 | 04 | 07 | 01 |
| 01 | 02 | 03 | 04 | 08 | 01 |
| 01 | 02 | 03 | 04 | 09 | 01 |
| 01 | 02 | 03 | 04 | 10 | 01 |
| 01 | 02 | 03 | 04 | 11 | 01 |
| 01 | 02 | 03 | 04 | 12 | 01 |
| 01 | 02 | 03 | 04 | 13 | 01 |
| 01 | 02 | 03 | 04 | 14 | 01 |

Figure 4A

| 01 | 02 | 03 | 04 | 05 | 13 |
|----|----|----|----|----|----|
| 01 | 02 | 03 | 04 | 06 | 13 |
| 01 | 02 | 03 | 04 | 07 | 13 |
| 01 | 02 | 03 | 04 | 08 | 13 |
| 01 | 02 | 03 | 04 | 09 | 13 |
| 01 | 02 | 03 | 04 | 10 | 13 |
| 01 | 02 | 03 | 04 | 11 | 13 |
| 01 | 02 | 03 | 04 | 12 | 13 |
| 01 | 02 | 03 | 04 | 13 | 13 |
| 01 | 02 | 03 | 04 | 14 | 13 |

Figure 4B

| 01 | 02 | 03 | 04 | 05 | 25 |
|----|----|----|----|----|----|
| 01 | 02 | 03 | 04 | 06 | 25 |
| 01 | 02 | 03 | 04 | 07 | 25 |
| 01 | 02 | 03 | 04 | 08 | 25 |
| 01 | 02 | 03 | 04 | 09 | 25 |
| 01 | 02 | 03 | 04 | 10 | 25 |
| 01 | 02 | 03 | 04 | 11 | 25 |
| 01 | 02 | 03 | 04 | 12 | 25 |
| 01 | 02 | 03 | 04 | 13 | 25 |
| 01 | 02 | 03 | 04 | 14 | 25 |

Figure 4C

| A | B | C | D | E | X | Win Level |
|---|---|---|---|---|---|---|
| 0 | 0 | 0 | 0 | 0 | 0 | 0 |
| 0 | 0 | 0 | 0 | 0 | 1 | 1 |
| 0 | 0 | 0 | 0 | 1 | 0 | 0 |
| 0 | 0 | 0 | 0 | 1 | 1 | 2 |
| 0 | 0 | 0 | 1 | 0 | 0 | 0 |
| 0 | 0 | 0 | 1 | 0 | 1 | 2 |
| 0 | 0 | 0 | 1 | 1 | 0 | 0 |
| 0 | 0 | 0 | 1 | 1 | 1 | 3 |
| 0 | 0 | 1 | 0 | 0 | 0 | 0 |
| 0 | 0 | 1 | 0 | 0 | 1 | 2 |
| 0 | 0 | 1 | 0 | 1 | 0 | 0 |
| 0 | 0 | 1 | 0 | 1 | 1 | 3 |
| 0 | 0 | 1 | 1 | 0 | 0 | 0 |
| 0 | 0 | 1 | 1 | 0 | 1 | 3 |
| 0 | 0 | 1 | 1 | 1 | 0 | 4 |
| 0 | 0 | 1 | 1 | 1 | 1 | 5 |
| 0 | 1 | 0 | 0 | 0 | 0 | 0 |
| 0 | 1 | 0 | 0 | 0 | 1 | 2 |
| 0 | 1 | 0 | 0 | 1 | 0 | 0 |
| 0 | 1 | 0 | 0 | 1 | 1 | 3 |
| 0 | 1 | 0 | 1 | 0 | 0 | 0 |
| 0 | 1 | 0 | 1 | 0 | 1 | 3 |
| 0 | 1 | 0 | 1 | 1 | 0 | 4 |
| 0 | 1 | 0 | 1 | 1 | 1 | 5 |
| 0 | 1 | 1 | 0 | 0 | 0 | 0 |
| 0 | 1 | 1 | 0 | 0 | 1 | 3 |
| 0 | 1 | 1 | 0 | 1 | 0 | 4 |
| 0 | 1 | 1 | 0 | 1 | 1 | 5 |
| 0 | 1 | 1 | 1 | 0 | 0 | 4 |
| 0 | 1 | 1 | 1 | 0 | 1 | 5 |
| 0 | 1 | 1 | 1 | 1 | 0 | 6 |
| 0 | 1 | 1 | 1 | 1 | 1 | 7 |

| A | B | C | D | E | X | Win Level |
|---|---|---|---|---|---|---|
| 1 | 0 | 0 | 0 | 0 | 0 | 0 |
| 1 | 0 | 0 | 0 | 0 | 1 | 2 |
| 1 | 0 | 0 | 0 | 1 | 0 | 0 |
| 1 | 0 | 0 | 0 | 1 | 1 | 2 |
| 1 | 0 | 0 | 1 | 0 | 0 | 0 |
| 1 | 0 | 0 | 1 | 0 | 1 | 3 |
| 1 | 0 | 0 | 1 | 1 | 0 | 4 |
| 1 | 0 | 0 | 1 | 1 | 1 | 5 |
| 1 | 0 | 1 | 0 | 0 | 0 | 0 |
| 1 | 0 | 1 | 0 | 0 | 1 | 3 |
| 1 | 0 | 1 | 0 | 1 | 0 | 4 |
| 1 | 0 | 1 | 0 | 1 | 1 | 5 |
| 1 | 0 | 1 | 1 | 0 | 0 | 4 |
| 1 | 0 | 1 | 1 | 0 | 1 | 5 |
| 1 | 0 | 1 | 1 | 1 | 0 | 6 |
| 1 | 0 | 1 | 1 | 1 | 1 | 7 |
| 1 | 1 | 0 | 0 | 0 | 0 | 0 |
| 1 | 1 | 0 | 0 | 0 | 1 | 3 |
| 1 | 1 | 0 | 0 | 1 | 0 | 4 |
| 1 | 1 | 0 | 0 | 1 | 1 | 5 |
| 1 | 1 | 0 | 1 | 0 | 0 | 4 |
| 1 | 1 | 0 | 1 | 0 | 1 | 5 |
| 1 | 1 | 0 | 1 | 1 | 0 | 6 |
| 1 | 1 | 0 | 1 | 1 | 1 | 7 |
| 1 | 1 | 1 | 0 | 0 | 0 | 4 |
| 1 | 1 | 1 | 0 | 0 | 1 | 5 |
| 1 | 1 | 1 | 0 | 1 | 0 | 6 |
| 1 | 1 | 1 | 0 | 1 | 1 | 7 |
| 1 | 1 | 1 | 1 | 0 | 0 | 6 |
| 1 | 1 | 1 | 1 | 0 | 1 | 7 |
| 1 | 1 | 1 | 1 | 1 | 0 | 8 |
| 1 | 1 | 1 | 1 | 1 | 1 | 9 |

Figure 5

SYSTEM AND METHOD FOR PRODUCING NON-REDUNDANT QUICK PICK NUMBER GROUPS FOR AUTOMATED LOTTERY TICKET SELECTION

TECHNICAL FIELD

At least one of the present embodiments generally relates to an apparatus or a method for producing a quick pick lottery (or other game of chance) result, and more particularly, to an apparatus or a method for efficiently and automatically using, e.g., a centralized server/computer to produce all possible non-redundant combinations of quick pick numbers for a particular lottery game to ensure that only one grand prize will be rewarded for the particular game.

BACKGROUND

The first recorded lottery occurred during the Chinese Han Dynasty between 205 A.D. and 187 B.C. A lottery is a form of gambling that involves the drawing of random whole numbers (integer) in a specific range and requires 1 or more participants to select in advance their guess of a random outcome to win at least one prize if the guess matches the drawing outcome. Lottery games consist of a finite group of numbers that exist within a predefined range that will be randomly selected to produce a subset of numbers found within the predefined range. The key idea of a lottery game is for a game contestant to guess in advance what the subset of numbers will be. To ensure there are a sufficient quantity of number subsets, the number range must be large enough and the subset number count must be small enough to produce a sufficient quantity of number combinations.

As an example, the Mega Millions Lottery (a very popular contemporary lottery game) has a number range of 1 to 70, with 5 of the 70 numbers randomly selected as a subset drawing. An additional bonus number is drawn separately with a range of 1 to 25, and is appended to the 5 number subset or group. This configuration results in the odds of winning the grand prize to be 302,575,350 to 1, which also represents the total 5 number subset or group combinations configured with a bonus number. To assist the contestant in picking numbers, the lottery system offers a courtesy feature where a contestant can request, with their paid entry, the lottery system to randomly generate 6 random number picks (5 subset and 1 bonus numbers) and submit them automatically as the contestant's entry. This process of producing machine generated "guesses" that will be automatically submitted as a contestant game entry is referred to as a "quick pick". Unfortunately, the present lottery systems do not keep track of prior quick pick selections. This lack of accounting and/or tracking for prior quick picks introduces the possibility of one or more identical quick picks being issued to one or more contestants. Therefore, the result may be multiple winners and requires them to share the grand prize, and hence reducing each winner's prize value.

SUMMARY

The drawbacks and disadvantages of the prior art are solved and addressed by one or more aspects described herein.

Therefore, according to an embodiment, an apparatus is presented for generating non-redundant machine-generated quick pick lottery game entries, comprising: at least a memory; one or more processors configured to: create a file that includes every possible combination of number groups eligible for being selected for a particular lottery game; randomly shuffle the every possible combination within the file to create a randomized list of non-redundant entries; assign a file index with a file index pointer to the randomized list of non-redundant entries; set the file index pointer to an initial position in the randomized list of non-redundant entries; and generate each non-redundant machine-generated lottery game entry by only sequentially incrementing or only sequentially decrementing the file index pointer in the randomized list, and outputting the each non-redundant entry indicated by the file index pointer to a ticket request device.

According to another embodiment, a method performed by an apparatus is presented, for generating non-redundant machine-generated quick pick lottery game entries, comprising: creating a file that includes every possible combination of number groups eligible for being selected for a particular lottery game; randomly shuffling the every possible combination within the file to create a randomized list of non-redundant entries; assigning a file index with a file index pointer to the randomized list of non-redundant entries; setting the file index pointer to an initial position in the randomized list of non-redundant entries; and generating each non-redundant machine-generated lottery game entry by only sequentially incrementing or only sequentially decrementing the file index pointer in the randomized list, and outputting the each non-redundant entry indicated by the file index pointer to a ticket request device.

According to another embodiment, a computer program product is presented for generating non-redundant machine-generated quick pick lottery game entries, the computer program product comprising computing instructions stored on a non-transitory computer storage medium and when the computing instructions are executed by one or more processors, configure the one or more processors to: create a file that includes every possible combination of number groups eligible for being selected for a particular lottery game; randomly shuffle the every possible combination within the file to create a randomized list of non-redundant entries; assign a file index with a file index pointer to the randomized list of non-redundant entries; set the file index pointer to an initial position in the randomized list of non-redundant entries; and generate each non-redundant machine-generated lottery game entry by only sequentially incrementing or only sequentially decrementing the file index pointer in the randomized list, and outputting the each non-redundant entry indicated by the file index pointer to a ticket request device.

BRIEF DESCRIPTION OF THE DRAWINGS

FIG. 3 illustrates an exemplary sample of a prize schedule used to determine winning combinations;

FIG. 4A illustrates an exemplary table representing the entries one to ten of the non-redundant number combinations;

FIG. 4B illustrates an exemplary table representing the entries 145,236,169 to 145,236,179 of the non-redundant number combinations;

FIG. 4C illustrates an exemplary table representing the entries 302,575,340 to 302,575,350 of the non-redundant number combinations;

FIG. 5 illustrates a table representing the win level determination table;

DETAILED DESCRIPTION

Figure 1:
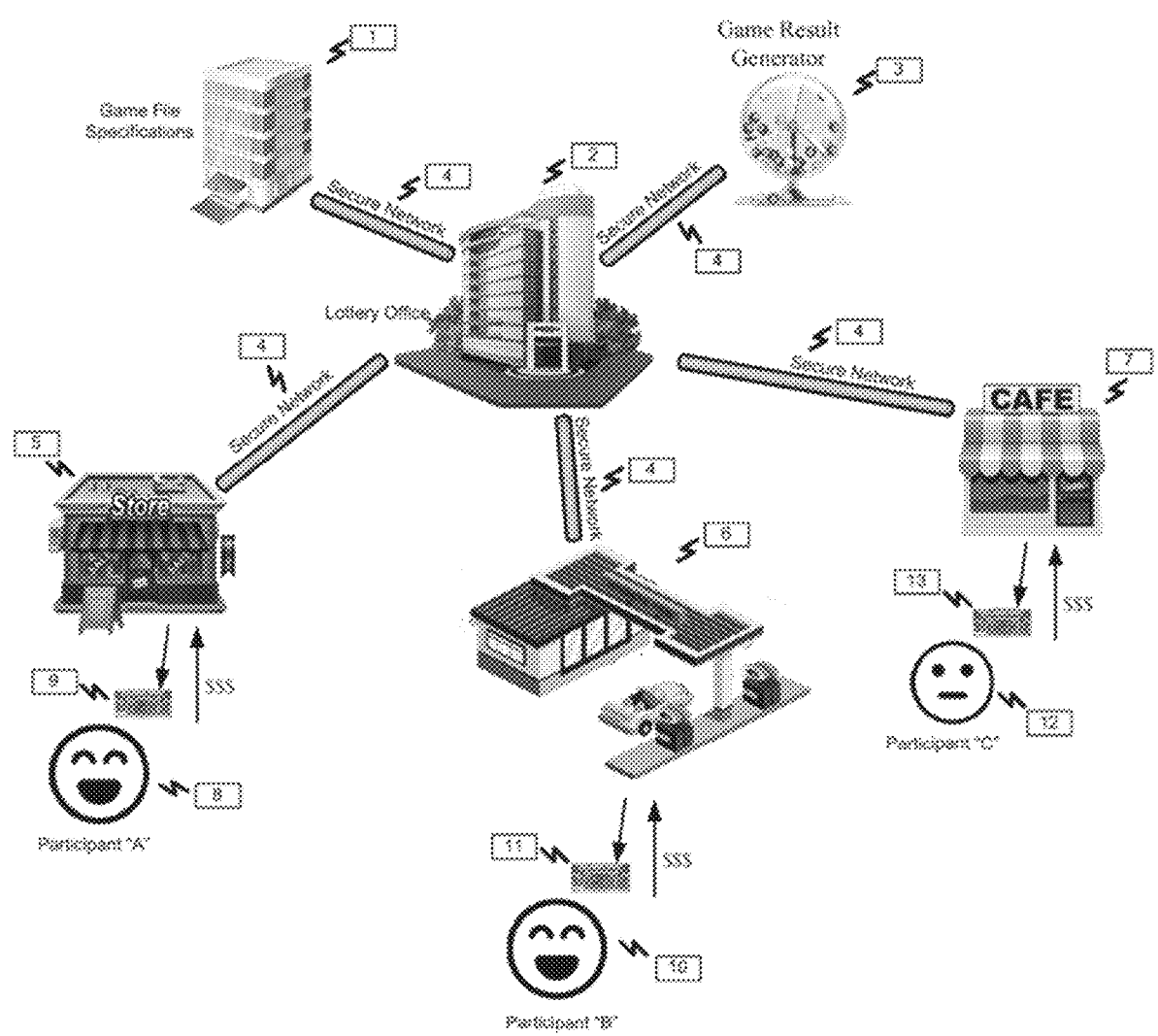
FIG. 1 illustrates an example of an overview diagram of a lottery game system.

FIG. 1 is a graphical block diagram of an exemplary lottery system which may support a lottery draw type number game. The Lottery Office 2 is the central point of the system for creating, implementing, managing, promoting, and officiating the results of the game.

The method and process of creating a lottery draw type number game begins with the creation of the game specifications 1. The specification may be developed at a secure site external to the main lottery office 2. Communication of the game specifications may occur using a secure internet connection 4 to the main lottery office 2. The Game File Specification 1 will indicate the type of draw game, the odds of winning the draw game, the cost associated with purchasing a ticket, the frequency of the draw game and how to win the game.

The Lottery Office 2 authorizes various retail establishments 5 6 7 to sell lottery tickets to participants. The participants may be allowed to "pick" their own numbers to use on their ticket or they may be allowed to utilize a random number generator (not shown) to select a "quick pick", where the random number generator selects the numbers to be used on the participants ticket. The retail establishments 5 6 7 communicate with the Lottery Office via Secure Network 4 to inform the Lottery Office of the purchased tickets details such as but not limited to date and time of sale, numbers selected, date and time of drawing the ticket is valid and vendor id.

FIG. 1 additionally shows, e.g., three game participants interacting with the lottery system via the authorized retail establishments. Participant "A" 8 has purchased a lottery ticket 9 from an authorized lottery reseller 5. The authorized lottery reseller 5 communications with the main lottery office 2 through a secure connection 4. Participant "B" 10 has purchased a lottery ticket 11 from an authorized lottery reseller 6. Participant "C" 12 has purchased a lottery ticket 13 from an authorized lottery reseller 7.

When Participant 8 10 12 initiate the purchase of lottery tickets 9 11 13, reseller 5 6 7 communicate with the Lottery Office 2. Based on the number of games, either manually chosen numbers or quick picks, purchased from participants 8 10 12, reseller 5 6 7 print a ticket 9 11 13 containing the number combination for each game purchased.

Draw type Lottery Tickets 9 11 13 are valid for one number drawing which will take place at a specified date and time using the game result generator 3. As a non-limiting example, the game result generator 3 can be a gravity pick or air mix mechanical machine or a computerized random number generator. The Game Result Generator 3 may or may not be located at a site external to the Lottery Office 2.

At a specified date and time, the game drawing occurs, and the results may be transmitted via secure network connection 4 to the main lottery office 2. The game drawing is typically broadcast on live television and the results are published by the Lottery Office 2 in print media and on digital media.

Participant 8 10 12 compare the number combinations on their Lottery Tickets 9 11 13 to the number combination generated by the Game Result Generator 3 by either watching the live drawing on TV, reviewing the results published in the local newspaper or on the website of the Lottery Office 2.

As mentioned previously, in prior quick pick lottery systems in which redundant quick pick numbers may be generated, after checking the Lottery Ticket 9 11 13 results, Participant "A" 8 and Participant "B" 10 may have discovered at least one of their number combinations matches the Game Result perfectly and are a grand prize winner. As both participants 8 10 have the grand prize winning combinations, they must split the grand prize between each other and with any other participants (not shown) which have a ticket containing the grand prize winning combination. Participant "C" 12 may or may not have had one or more secondary winning combinations on their respective Lottery ticket 13.

Accordingly, to overcome the limitation of existing redundant quick pick games, present embodiments may be divided into three possible processes or steps. Process one is the generation of all possible number combinations for the lottery game. Process two consists of shuffling the combinations provided in process one so they are in random order when requested by the contestants. Processes one and two are performed prior to the start of the lottery game. In real time during process three, a contestant may select one or more quick picks to form a collection of quick picks. Again, present embodiments provide the technical advantage over the prior systems that all quick picks generated will be non-redundant (i.e., generated just once). By enforcing non-redundancy, there can be only one potential grand prize winner. To also ensure non-redundancy, the quick pick distribution system must stop issuing contestant entries when the last quick pick is assigned to a contestant. Process three may also produce a printed QR code, which will allow the system payout function to identify all of the quick pick selections made by a specific contestant once the lottery drawing is complete.

Figure 2:
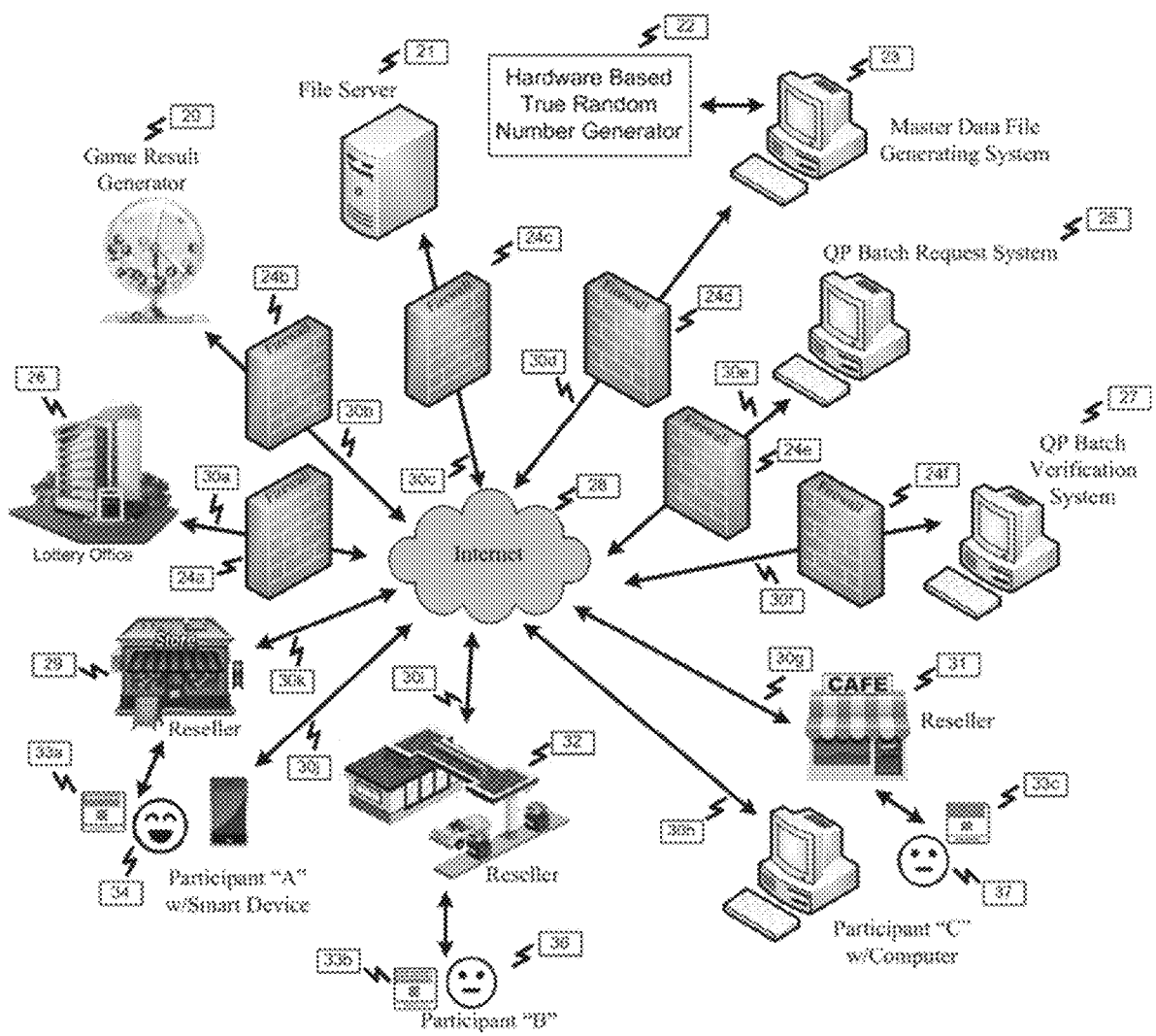
FIG. 2 illustrates another example of a non-redundant quick pick ticket system.

FIG. 2 is another exemplary block diagram of a lottery system capable of supporting a non-redundant quick pick (NRQP) ticket system, according to present embodiments. The creation of a non-redundant quick pick ticket begins with the creation of the game specifications 21. The specification may be developed at a secure site external to the main lottery office 26. Communication of the game specifications may occur using a secure internet connection 30c with a security firewall 24c to the main lottery office 26 connected to the internet 28 via secure internet connection 30a with a security firewall 24a.

The Master Data File Generator system 23 may be located at a secure site external to the main lottery office 26 and based on the game specifications file 21 generates a master datafile (not shown) containing all possible non-redundant number combinations. The Master Datafile (not shown) is distributed through the internet 28 via secure connection 30d and security firewall 24d to the QP Batch Request System 25 and the QP Batch Verification System 27.

FIG. 2 additionally shows, e.g., three game participants interacting with the lottery system supporting the NRQP ticket system.

Participant "A" 34 has purchased a NRQP ticket 33a from an authorized lottery reseller 29. The authorized lottery reseller 29 communications with the main lottery office 26 through a secure connection 30k via the internet 28. Participant "B" 36 has purchased a NRQP ticket 33b from an authorized lottery reseller 32. The authorized lottery reseller 29 communications with the main lottery office 26 through a secure connection 30i via the internet 28. Participant "C" 37 has purchased a NRQP ticket 33c from an authorized lottery reseller 31. The authorized lottery reseller 31 communications with the main lottery office 26 through a secure connection 30g via the internet 28.

When participants 34 36 37 initiate the purchase of NRQP ticket 33a 33b 33c, resellers 29 31 32 communicate with the QP Batch Request System 25 via the internet 28 and secure connection 30e and security firewall 24e to request a batch of non-redundant number combinations. Based on the number of quick picks requested by Participant 34 36 37, the QP Batch Request System will select the next number of non-redundant number combinations in the Master Data File. The QP Batch Request System 25 will next generate an image of a multi-dimensional bar code and will transmit the image back to the resellers 29 31 32 via the internet 28. Resellers 29 31 32 print a respective NRQP ticket 33a 33b 33c containing the image of the multi-dimensional bar code for the respective participant 34 36 37.

NRQP tickets 33a 33b 33c are valid for one number drawing which will take place at a specified date and time using the game result generator 20. As a non-limiting example, the game result generator 20 may be a gravity pick or an air mix mechanical machine or a computerized random number generator.

At a specified date and time, the game drawing occurs, and the results may be transmitted via a secure internet connection 30b through security firewall 24b to the QP Batch Verification System 27 which may be located at a secure site external site to the main lottery office 26. The QP Batch Verification System 27 is securely connected to the internet 28 via secure internet connection 30f and security firewall 24f.

Participant "A" 34 using an internet enabled smart device connects to the QP Batch Verification System 27 via the internet 28 and secure connection 30j. Participant "C" 37 using an internet connected computer device connects to the QP Batch Verification System 27 via the internet 28 and secure connection 30h. Participant "B" 36 may return to reseller 32 to access the QP Batch Verification System 27 through the NRQP ticket lottery system.

Participants 34 36 37 may select to have a display of their NRQP ticket details, or the winning results based the Game Specification File residing on file server 21, having the game results and the non-redundant number combinations associated with their NRQP ticket 33a 33b 33c. The QP Batch Verification System 27 will access the Master Data File and using the data provided by the decoded multi-dimensional bar code determine the non-redundant number combinations which are associated with the NRQP tickets 33a 33b 33c. If participants 34 36 37 selected to view the ticket details, a list of the non-redundant number combinations will be transmitted via the internet 28. If participants 34 36 37 selected to view the results, the QP Batch Verification System 27 will calculate the total number of winning combinations. The results will be transmitted to the participants 34 36 37 via the internet 28.

After checking the NRQP tickets 33a 33b 33c results, participant "A" 34 may have discovered he/she is the sole grand prize winner. Participant "B" 36 and participant "C" 37 may or may not have had one or more secondary winning combinations on their respective NRQP ticket. In any case, there will only be a sole grand prize winner, since the present lottery/game system and method will produce only one such winning combination, unlike the previous lottery/game systems and methods.

FIG. 3 illustrates a non-limiting example of the prize schedule associated with the NRQP game. The prize schedule describes the various conditions required to win a prize. It is shown that there are 11 distinct win levels with levels 0, 2, and 4 being non-winning conditions.

FIGS. 4A to 4C illustrate 3 tables containing partial examples of non-redundant number combinations, having a number group number of 6 which has a main number group number of 5 and a bonus number group number of 1 (i.e., 5 main lottery group number positions, plus 1 bonus number position). FIG. 4A is a table showing possible entries one to ten of the non-redundant number combinations. FIG. 4B illustrates a table representing possible entries 145,236,169 to 145,236,179 of the non-redundant number combinations. FIG. 4C illustrates a table representing possible entries 302,575,340 to 302,575,350 of the non-redundant number combinations. Although not shown here, one or more bonus number positions may also be used by a different lottery system to increase the total number of the group number to more than 6.

FIG. 5 illustrates a win level determination table. The determination table is a logical truth table which identifies the win level outcome based on the functional arguments. In the non-limiting example, each of the 5 balls can be represented by variables A, B, C, D, and E. The odds extender or Mega bonus ball number can be represented by the variable X. In the win level determination table as shown in FIG. 5, a zero represents the ball drawn does not match a number in the NRQP entry, while a one represents a match. By example, the first entry in the win level determination table contains 6 zeros. This represents there were no matches on the 5 main balls and no match on the Mega bonus ball. This results in the win level outcome of zero (no prize). Conversely, the last entry in the table contains 6 ones. This represents a 5 of 5 main ball match and a match on the Mega bonus ball. This results in a win level outcome of 9 or the grand prize win. The win level determination table may be stored in ROM for access by the microcontroller/processor for a fast lookup process to determine the win level of a NRQP number combination.

Figure 6A:
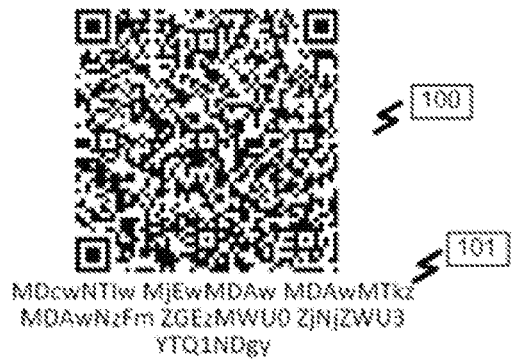
FIG. 6A illustrates an example of the multi-dimensional bar code encoded with data.
Figure 6B:
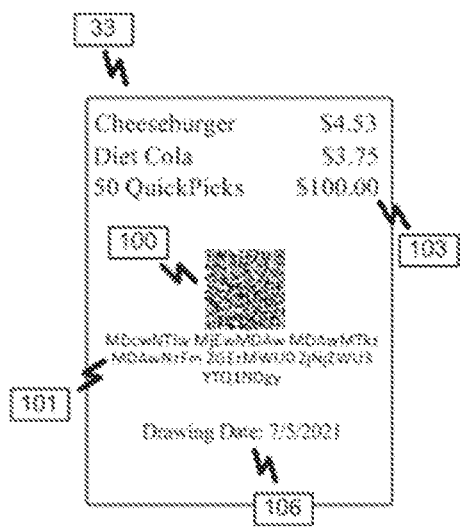
FIG. 6B illustrates an example of a non-redundant quick pick ticket.

FIGS. 6A and 6B illustrate pictorial representations of a non-limiting example of a NRQP ticket 33 and its associated multi-dimensional bar code 100. FIG. 6A shows a multi-dimensional bar code 100 which contains the URL of the QR Verification System website. The multi-dimensional bar code 100 also contains the Batch Request variable (BRV) 101. The URL and BRV 101 is used to display the NRQP number combinations associated with the code and to determine if any NRQP number combinations are winners. If the participant does not have access to an optical scanner, they may access the URL designated website through any internet enabled device and manually enter the BRV 101. FIG. 6(b) illustrates an example NRQP lottery system ticket 33. In this example, the ticket shows an itemized list of items 103 associated with the lottery or game ticket purchased by the participant. The list shows two food items in addition to their 50 NRQP quick picks. The ticket also contains the multi-dimensional bar code 100, the BRV 101 and the date of the drawing 106 which the NRQP number quick picks ticket is associated with.

Figure 7:
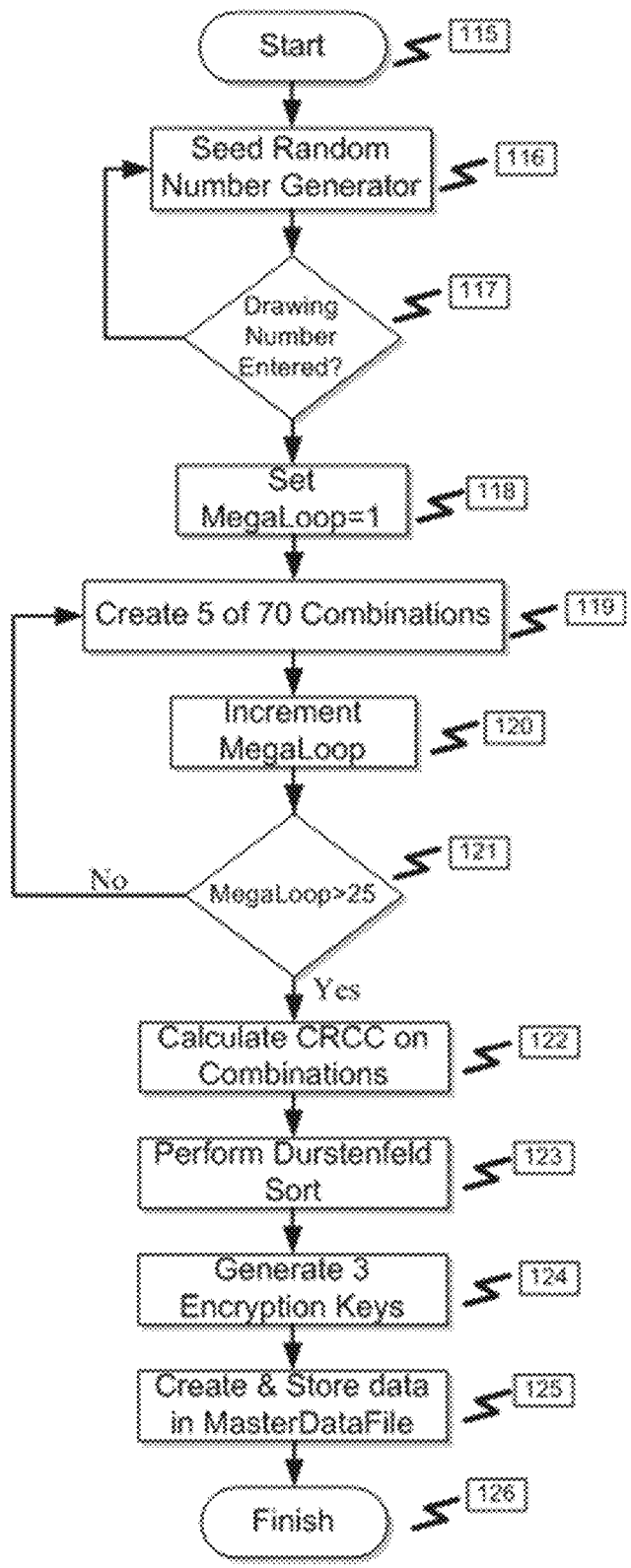
FIG. 7 illustrates a flowchart of a non-redundant number combination master datafile.

FIG. 7 illustrates a flow chart depicting an exemplary main/overall routine for producing the Master Datafile containing the randomized NRQP number combinations for a particular group/subset number associated with a particular game. The program begins at step 115. The random number generator is "seeded" to produce non-deterministic results in step 116. The program will determine if a drawing number has been entered in step 117. In step 118, the program sets the variable MegaLoop to 1. Step 119 calls the function which creates the non-redundant number combinations for a group of 5 numbers of 70 possible number range (e.g., 0 to 69 or 1 to 70) drawing. Once all possible number combinations for the group/subset of 5 numbers have been generated, the program increments the MegaLoop variable by 1 in step 120. The program determines if MegaLoop is greater than 25 in step 121. If the variable is less than 25, the program loops back to step 119. If the variable is greater than 25, the program continues to step 122 and calculates the CRCC over each non-redundant number combination. The program performs a Durstenfeld sort in step 123 to randomize the order of the number combinations. Next the program calls the function to generate 3 encryption keys 124 which will be used by the QP Batch Request and QP Batch Verification systems to encode/decode the Verification Codes. In step 125, the program writes the shuffled NRQP number combinations into the Master DataFile and exits in step 126. Accordingly, all possible NRQP number combinations are generated and randomized, and are placed into the Master DataFile and stored in one or more memories.

Figure 8:
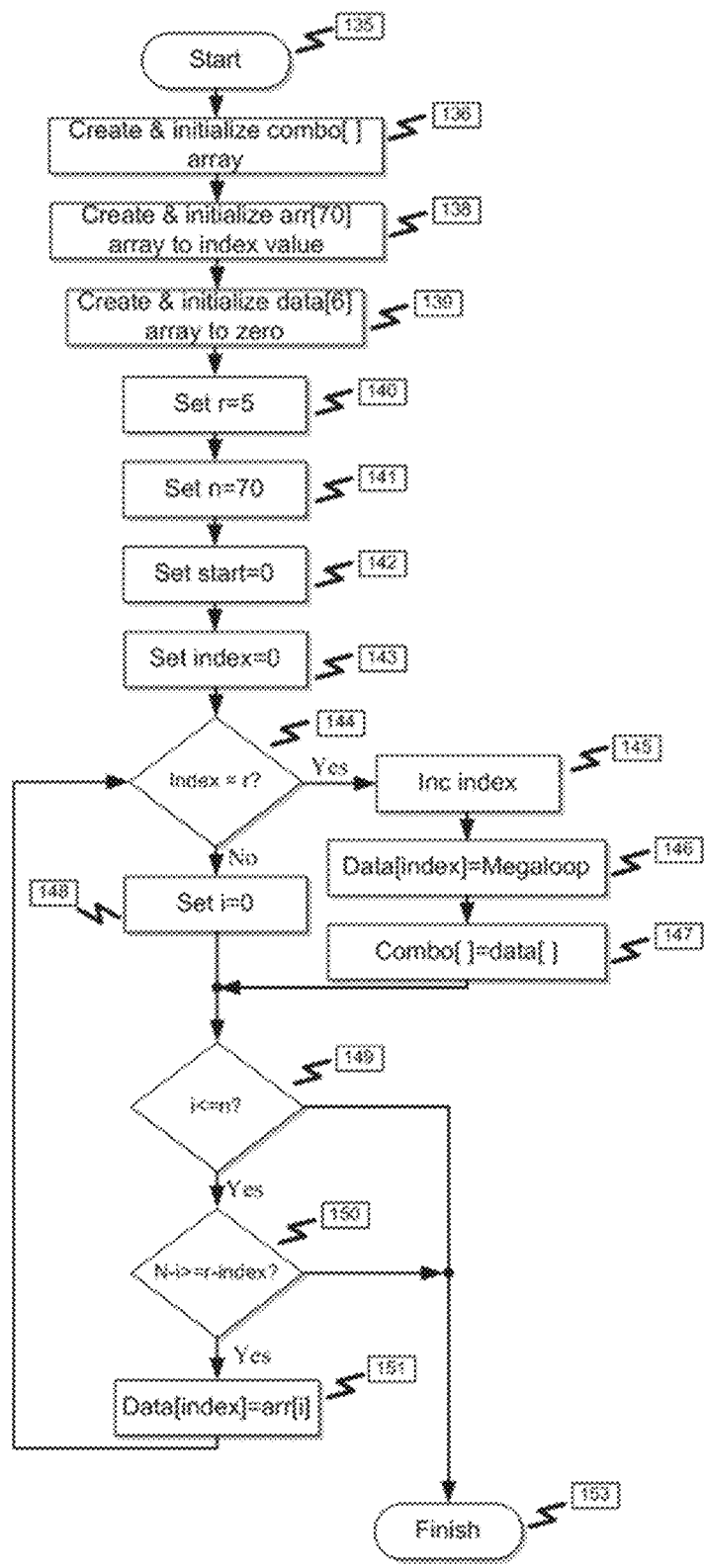
FIG. 8 illustrates a flowchart of a non-redundant number combination generator.

FIG. 8 illustrates a flow chart for a process/function call which may be used to create the non-redundant number combinations, e.g., as called and illustrated in the main process shown in FIG. 7. The function enters at step 135 and creates and initializes an array called Combo[ ] in step 136. The function continues to step 138 and creates and initializes a seventy element array. In step 139, the function creates and initializes another array called Data. In steps 140 141 142 143, the function initializes working variables used during the number combination creation process. In step 144, the function checks to see if the 5 number combination has been created (variable index is equal to variable r). If the variables are not equal, the function continues to a "For-Next" loop represented by 148 149 150 151 to create and store in the data array, the five number non-redundant combinations. If the 5 number group combination has been fully generated 144, the program increments the index variable by one 145 and stores the Megaloop bonus variable as the sixth element in the data array 146. The temporary data array is then stored in the global Combo array 147. If all non-redundant number combinations for the 5 main number and 1 bonus number groups have been generated, the method returns to the calling function 153.

Figure 9:
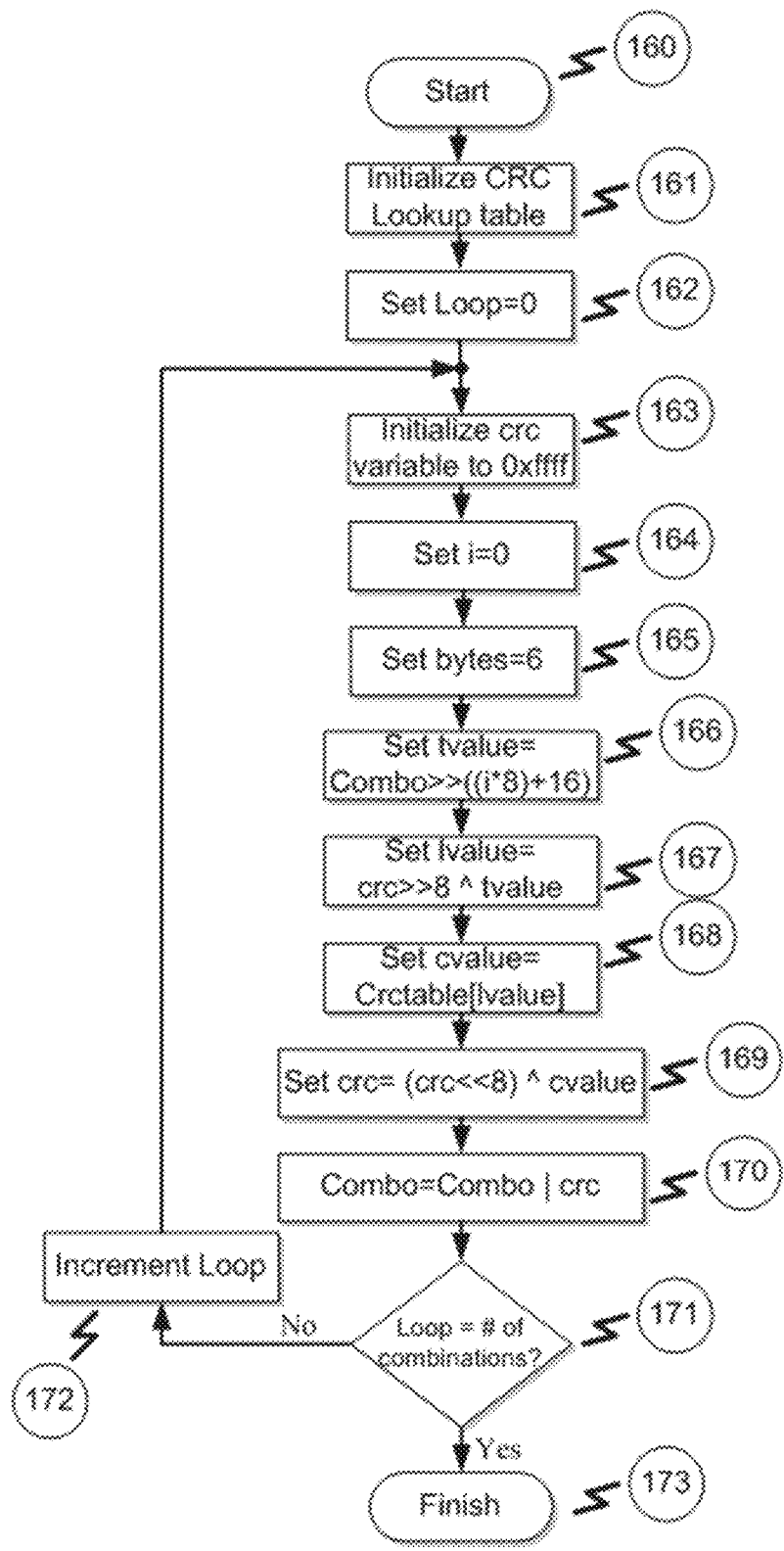
FIG. 9 illustrates a flowchart of a 16 bit Cyclic Redundancy Check Code generator.

FIG. 9 illustrates a process/function call which may be used to calculate the CRCC-16 for the NRQP number combinations, as called and illustrated in the main process shown in FIG. 7. The function enters in step 160 and initializes the CRC lookup table in step 161. In step 162, the function initializes the variable loop to 0. In step 163, the program initializes the variable crc to 0xffff and the variable i to zero in step 164. In step 165, the function sets the variable bytes to 6 and continues to step 166 to calculate the variable tvalue. Next in step 167, the function calculates the variable lvalue and continues to step 168 and sets the variable of cvalue to the value at location lvalue in the CRC lookup table. In step 169, the function calculates the variable crc and appends the variable to the end of the NRQP number combination in step 170. In step 171, the function determines if all CRCC-16s have been calculated. If not, the function continues to step 172 to increment the variable loop before returning to step 163. If all CRCC-16s have been calculated, the function returns to the main routine via step 173.

Figure 10:
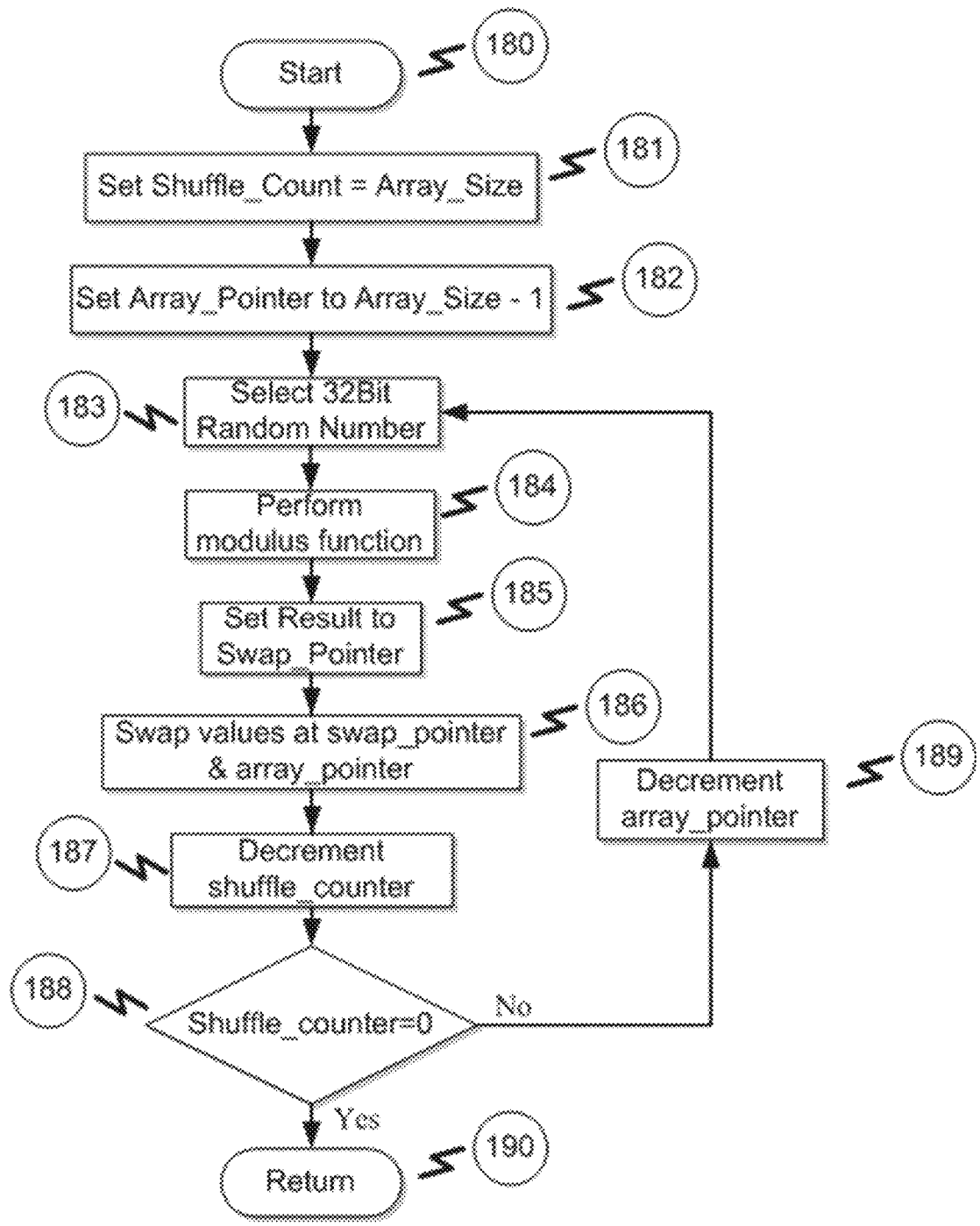
FIG. 10 illustrates a flowchart of a Durstenfeld shuffle function.

FIG. 10 illustrates a process flow chart for the Durstenfeld Shuffle function which may be used to randomize the various data arrays, e.g., as called and illustrated in the main process shown in FIG. 7. The process enters the function through the Start 180 block. Since various routines utilize this function, the Shuffle_Count variable must be set to equal the Array_Size 181 and the Array_Pointer variable is set to Array_Size—one 182. Once a 32-Bit True Random Number is generated 183 a non-truncated biased modulus function is performed 184 to ensure the Random Number generated is within the range of 0 to Array_Pointer. The result of the modulus function is set to the Swap_Pointer 185 and the values in the array stored at Array_Pointer and Swap_Pointer are transposed 186. The variable shuffle_count is decremented by one 187 and checked to see if it is equal to zero 188. If shuffle_count is not equal to zero, there are more elements to shuffle so array_pointer is decremented by one 189 and the process repeats from the selection of the 32-bit number 183. Once shuffle_count equals zero, the shuffle of the array has been completed and the function can return 190 to the calling routine.

Figure 11:
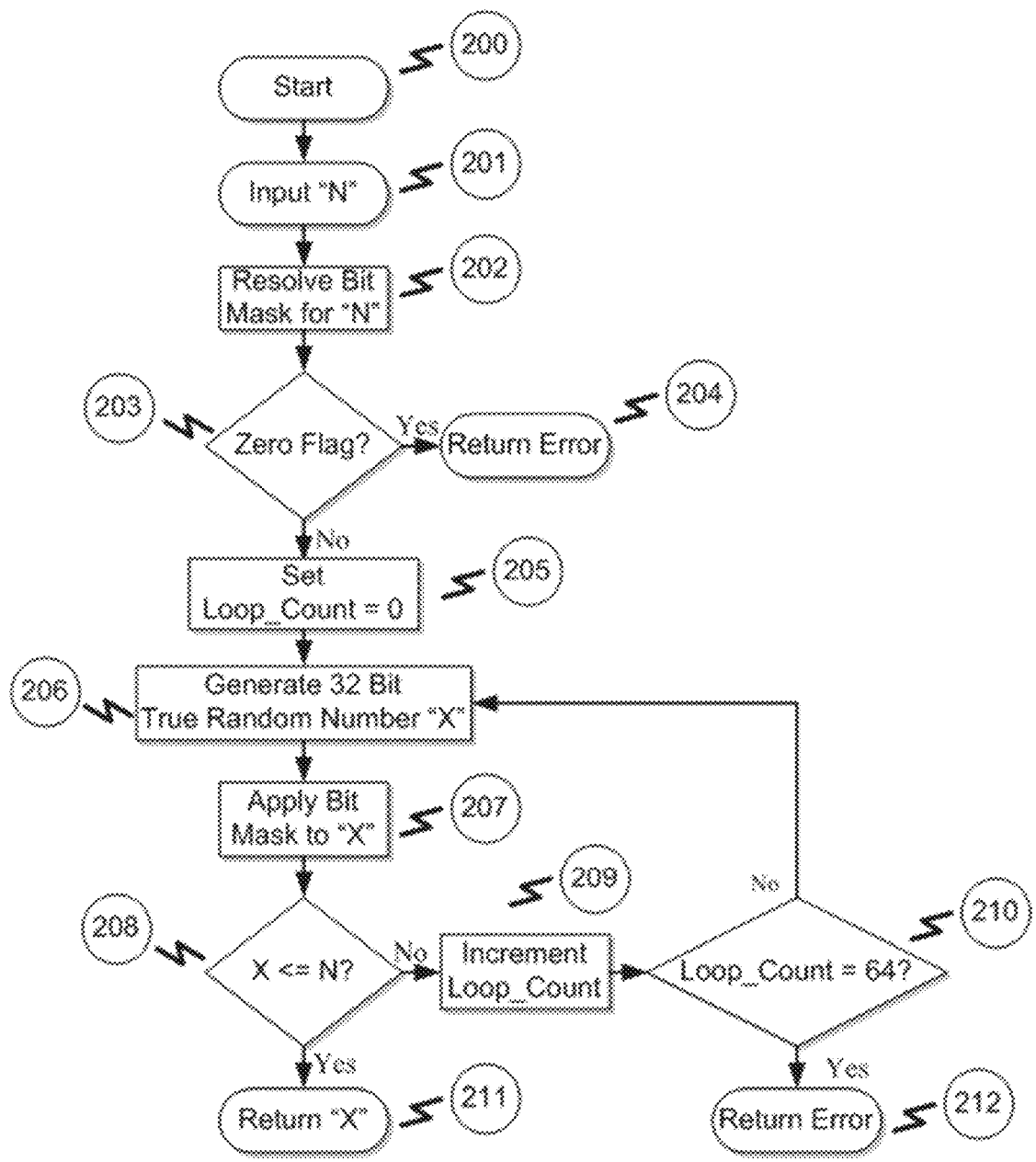
FIG. 11 illustrates a flowchart of a true random number generator with modulus.

FIG. 11 illustrates an exemplary flow chart for a process/call for generating a true random number between the vales of 0 and "N", as may be called as illustrated in the main process shown in FIG. 7. The term true indicates that some physical source of noise or random behavior is being measured and an unsigned 32-bit digital number is produced. Some examples of physical random sources are nuclear decay of a radioactive material, white noise voltages produced by a resistor at a specific temperature, randomly phased oscillators being sampled, or semiconductor "shot" noise, to name a few examples. A key attribute of the various "noise" sources is that they are non-deterministic in terms of behavior and can only be described on a statistical basis. Usually the physical noise source is "whitened" using software to decorrelate sample values.

As an example, using an unsigned 32-bit integer, the random values would vary from 0 to 4,294,967,296. When targeting specific probabilities, a modulus function is used to set the upper limit on the random outcome, for example, 1 in 100. A modulus of 100 applied to the 32-bit raw random number value will produce a random value of 0-99. The modulus function is based on an arithmetic decision function generally expressed as: N/D, remainder R. By example, if N is 10 and D is 8, then R=2. For the purpose of random number generation, the modulus function introduces "truncation bias" which will affect the statistical outcome. The effect of truncation bias must be compensated for when producing random integer value between 0 and "N".

Steps 200, 201 of FIG. 11 start the function of generating a 32-bit unsigned random number between a value of 0 to "N", where N is an input variable defining the upper limit of the random number return. Step 202 determines an "ANDing" logical mask to be applied to the modulus "N" to correct for truncation bias. Step 203 traps an error whereby the modulus is 0 and returns to the calling function at step 204.

Step 205 starts the process of requesting an unsigned 32-bit hardware generated random number. Step 206 executes a suitable function to access the true random number generator. Step 207 applies the truncation correction bit mask. Step 208 determines if the random number exceeds the modulus limit defined by the bit mask.

If the random number is within the limits of the bit mask, the value is returned at step 211. If the random number exceeds the bit mask limit, the loop_count is incremented (step 209) and the loop_count limit is checked 210. If loop_count is exceeded, then an error is declared and the function returns in step 212, otherwise the functions loops to step 206 and a new random number is selected.

Figure 12:
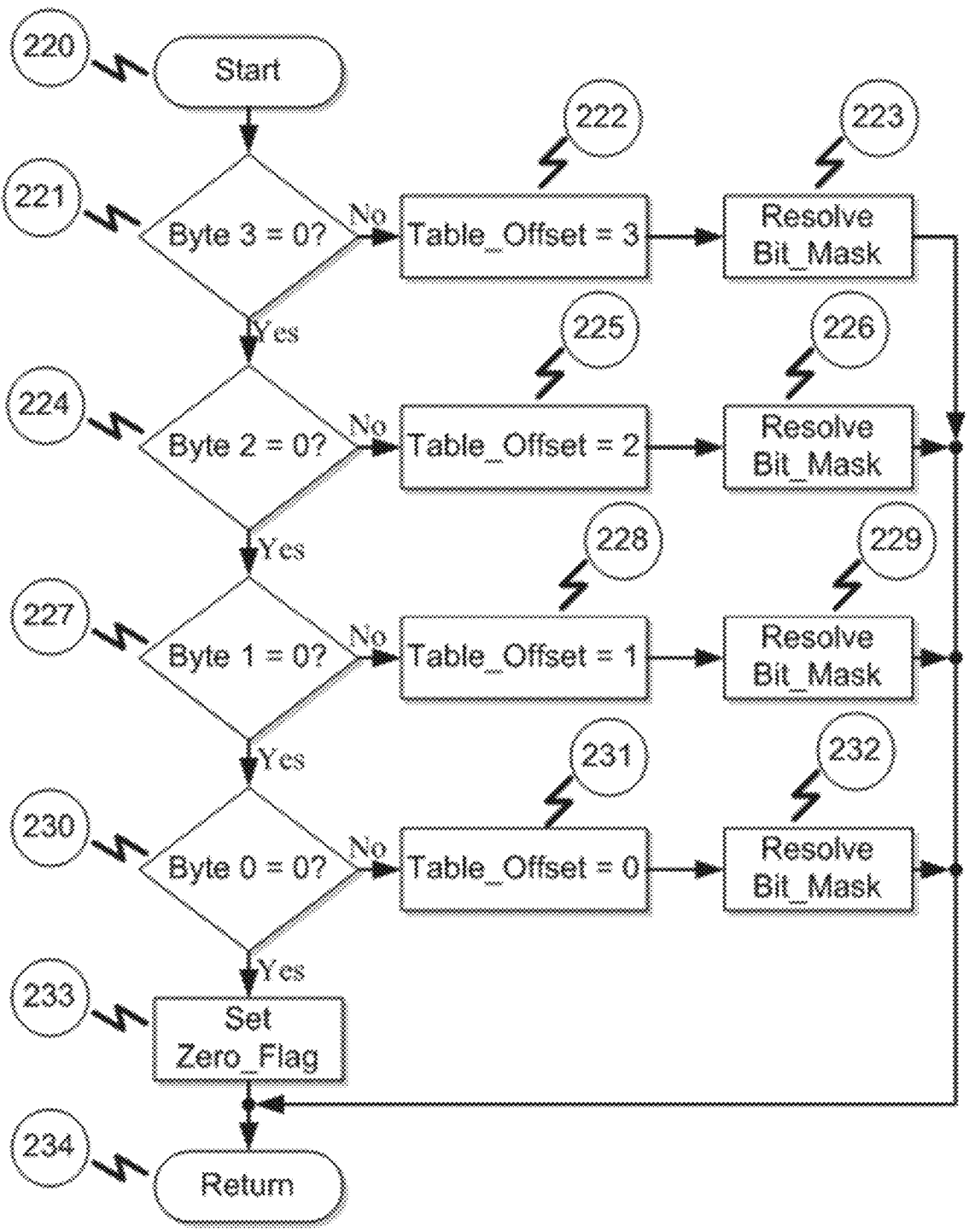
FIG. 12 illustrates a flowchart of a modulus bit mask function.

FIG. 12 illustrates an exemplary process/function call for creating a modulus bit mask in flowchart form. The modulus value is in a 32-bit unsigned format, which can be broken into four 8-bit groups (bytes). The flowchart begins at 220 with each byte of the modulus is checked for a non-zero value 221 224 227 230. If found, a table_offset variable is assigned 222 225 228 231 and a bit mask will be resolved 223 226 229 232 and the function exits 234. If all four groups are set to 0, then the modulus is set to 0, which is an illegal value. If a 0 modulus is detected, an error flag is set (zero flag) 233 and the function exits 234.

Figure 13:
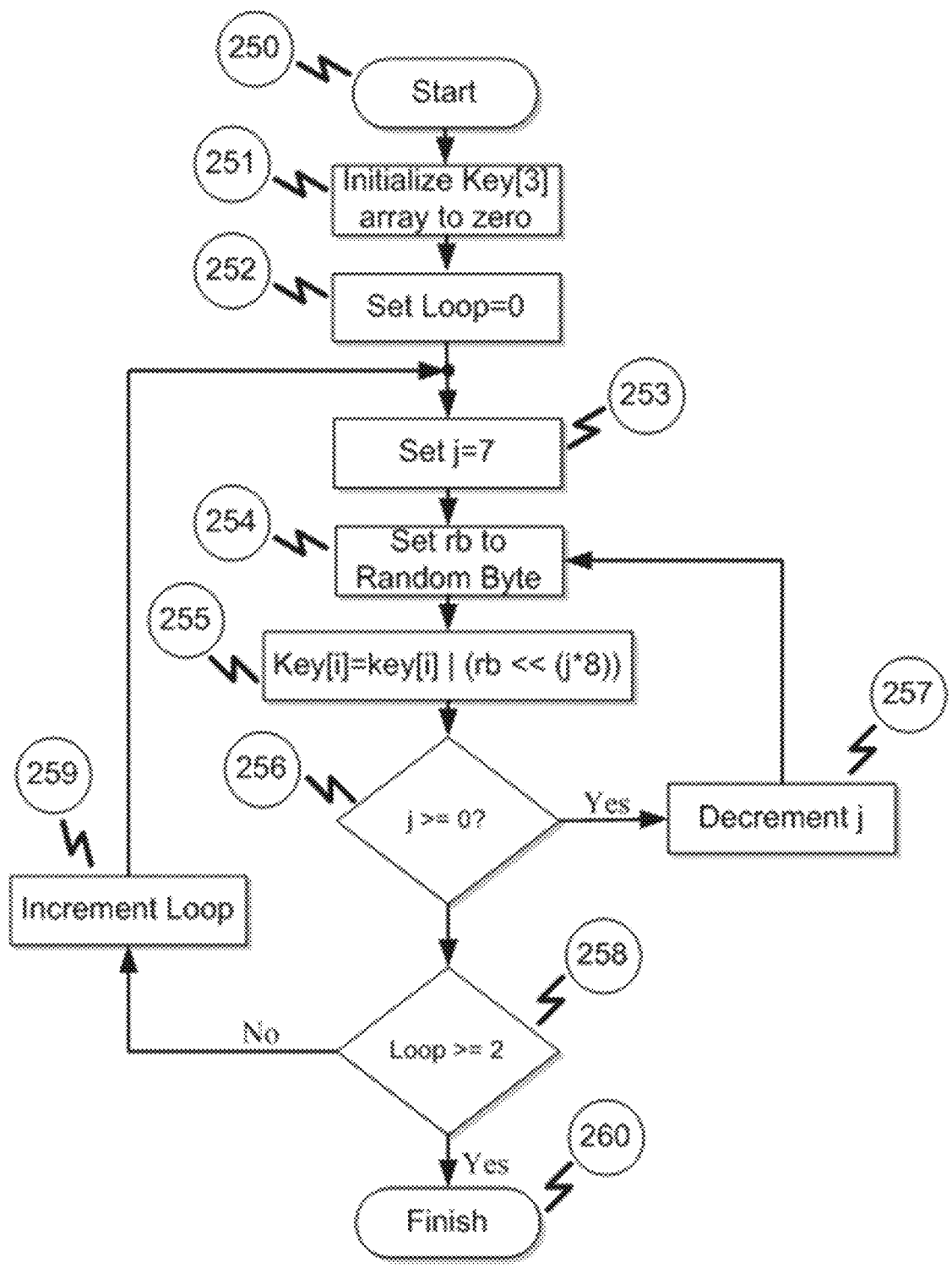
FIG. 13 illustrates a flowchart of an encryption key generation function.

FIG. 13 is a method function flow chart which starts at step 250. The 3 element array variable Key[ ] is initialized to zero 251. The loop variable is set to zero 252 and the variable j is set to seven 253. An eight bit random number is generated and assigned to the variable rb 254. rb is left shifted and then appended to the end of the current value of key[loop] 255. The function determines if eight random bytes have been generated 256. If the answer is yes, the variable j is decremented 257 and the function loops to step 254. If eight bytes have been generated, the function checks if three keys have been generated 258. If not, the function increments the variable loop 259 and loops to step 253, otherwise the function exits 260.

Figure 14:
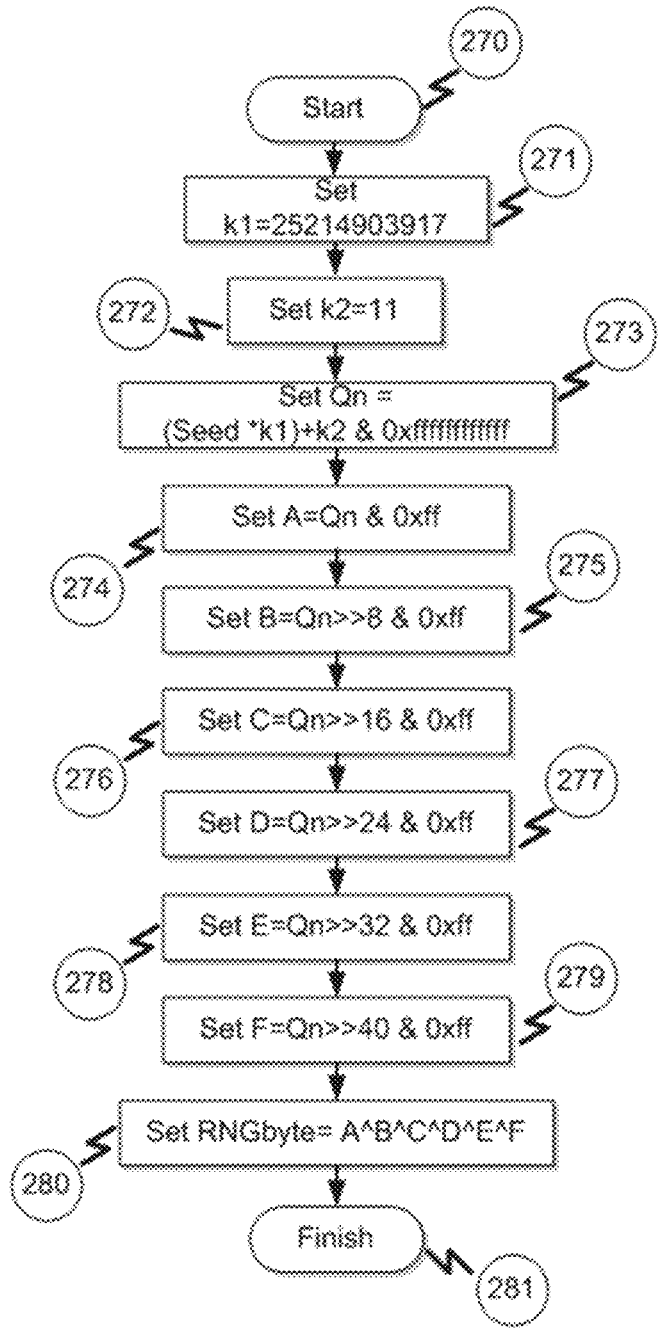
FIG. 14 illustrates a flowchart a software based random byte generator.

FIG. 14 illustrates a non-limiting example of an alternative software random number generator. The function enters 270 and sets the constant variables k1 and k2 271 272 before calculating Qn 273. The function then assigns variable A to the lower eight bits of Qn 274, variable B to bits eight-fifteen 275, variable C to bits sixteen-twenty-three 276, variable D to bits twenty-four-thirty-one 277, variable E to bits thirty-two-thirty-nine 278, and variable F to bits forty-forty-seven 279. Next the function calculates the random byte value by XORing the variables A, B, C, D, E, F 280 before returning to the calling program 281.

Figure 15:
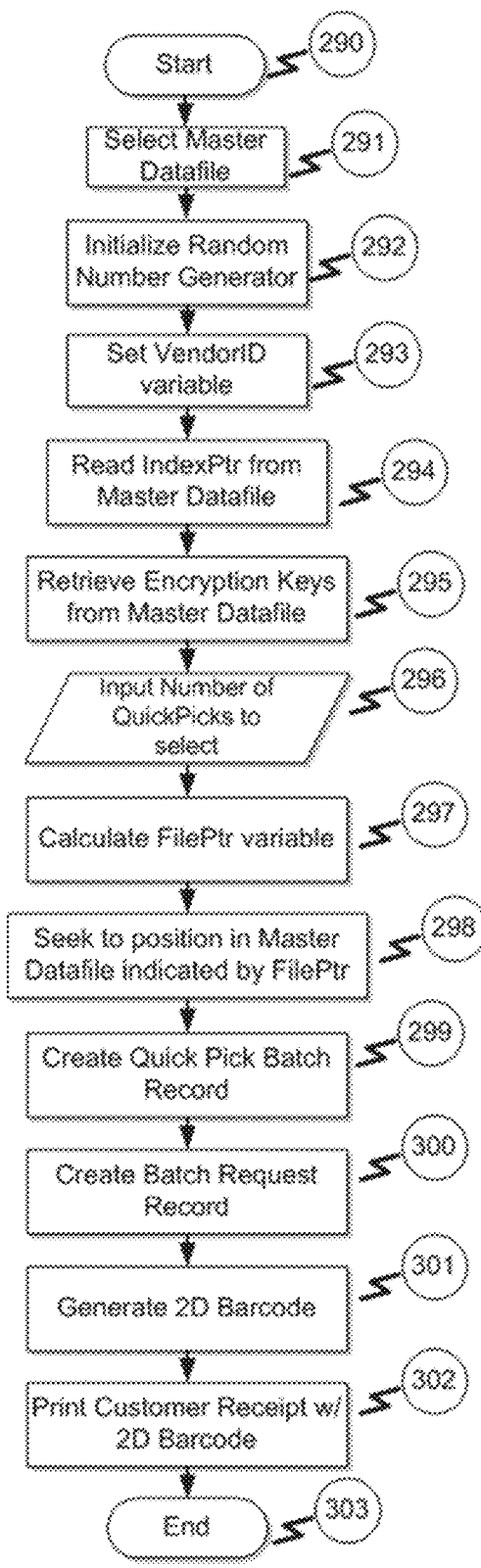
FIG. 15 illustrates a flowchart of a reseller software main routine.

FIG. 15 is a method flow chart depicting the main routine for the software used in the kiosk in the NRQP Promotional System. The method begins 290 by opening the appropriate Master Datafile associated with the next drawing of the NRQP Results generator 291. The method initializes or "seeds" a random number generator 292 before assigning the VendorID variable 293. The method reads in the IndexPtr variable stored in the Master Datafile 294. The IndexPtr indicates to the method the number of NRQP number combination previously used. Next the method retrieves the 3 encryption keys stored in the Master DataFile 295. The next step sets the number of NRQP number combinations to be selected from the Master DataFile 296. This can be either a variable number input from the participant or a preset number. The method calculates the FilePtr variable by multiplying the IndexPtr value by the size of a NRQP number combination 297 and then it seeks to this position on the Master Datafile 298. Next the function calls two addition functions to create the Quick Pick Batch Record 299 and the Batch Request Record 300. Once the control is returned to the function, an additional function is called to generate the multi-dimensional bar code 301 before printing the code on the NRQP ticket 302 and exiting 303.

Figure 16:
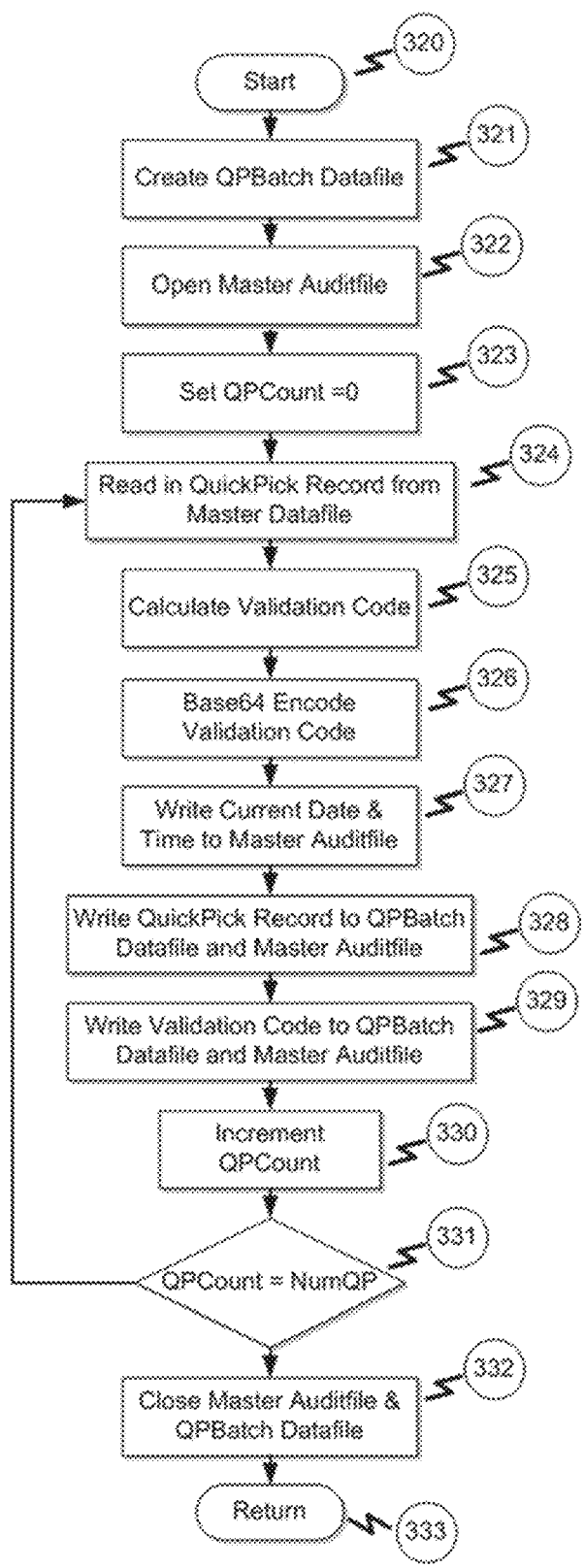
FIG. 16 illustrates a flowchart of a quick pick batch record generator.

FIG. 16 is a flow chart for the subfunction to create a Quick Pick Batch record. The function starts 320 and proceeds to create the QPBatch DataFile 321 which will store the NRQP Number combinations associated with the QP batch. The function opens the Master AuditFile 322 which is used during the verification process. The variable QPCount is initialized to zero 323. The function will then read the NRQP Number combination 324 from the Master DataFile and will calculate the verification code 325 using the three encryption keys. The verification code is Base64 encoded 326 prior to the function writing the current date and time to the Master AuditFile 327 and the NRQP Number Combination 328 and the Validation Code 329 to both the Master DataFile and the Master AuditFile. The variable QPCount is incremented by one 330 then compared to the NumQP variable 331. If the variables do not match, the function reads in the next NRQP Number combination 324 otherwise the function closes the Master DataFile and Master AuditFile 332 before returning 333.

Figure 17:
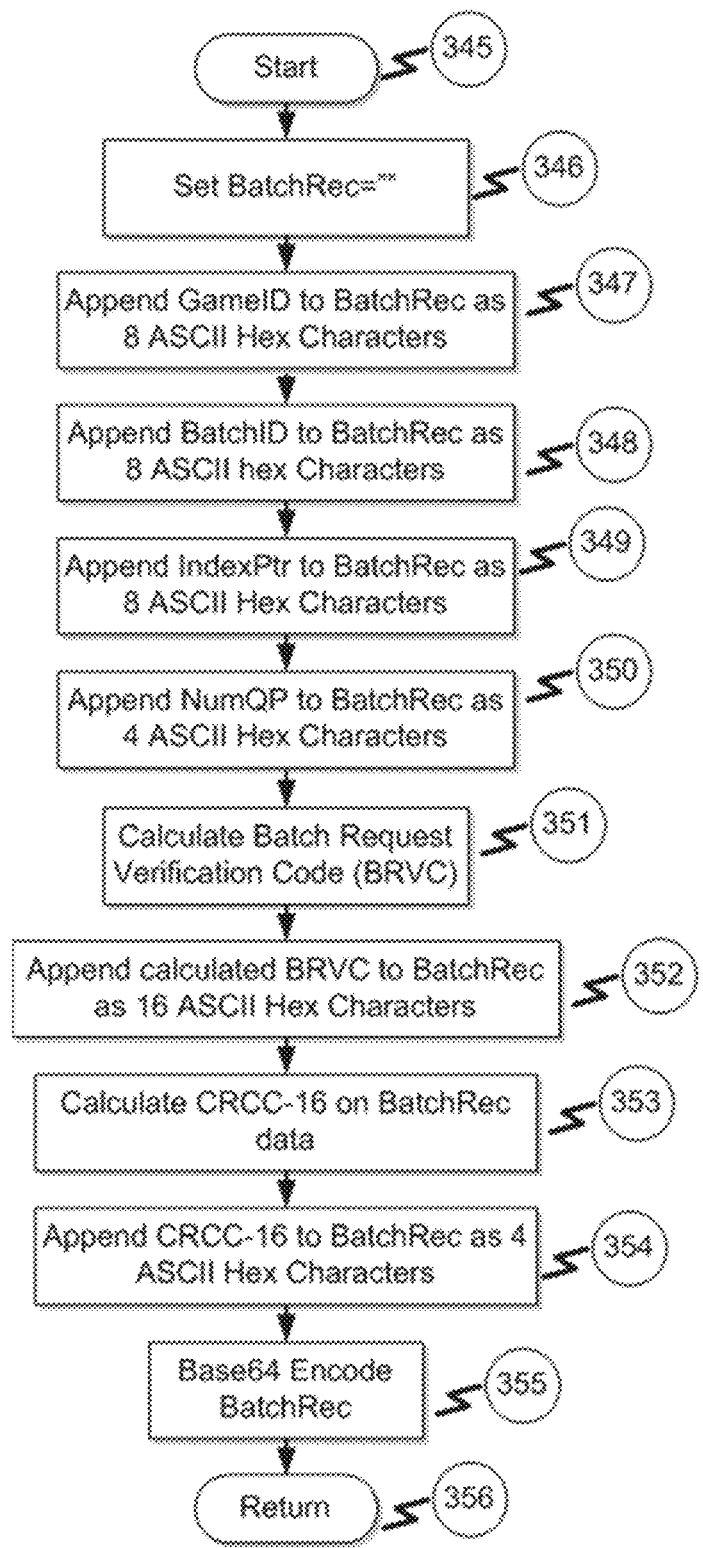
FIG. 17 illustrates a flowchart of a batch request record generator.

FIG. 17 begins at step 345 and illustrates the flow chart for the function to create a batch request record. The function initializes and nulls the variable BatchRec 346. The function converts the GameID to eight ASCII hex characters and stores in the BatchRec variable 347. The BatchID is converted to eight ASCII hex characters and appended to the BatchRec variable 348. The IndexPtr variable 349 and the NumQP variable 350 are converted to eight and four ASCII Hex characters, respectively and appended to the BatchRec variable. The Batch Request Verification Code (BRVC) is calculated 351 and appended to the BatchRec variable as sixteen ASCII Hex characters 352. A CRCC-16 checksum is calculated across the BatchRec variable 353 and appended as 4 ASCII Hex characters to the BatchRec variable 354. The function returns 356 after Base64 encoding the BatchRec variable 355 as the Batch Request Variable (BRV).

Figure 18:
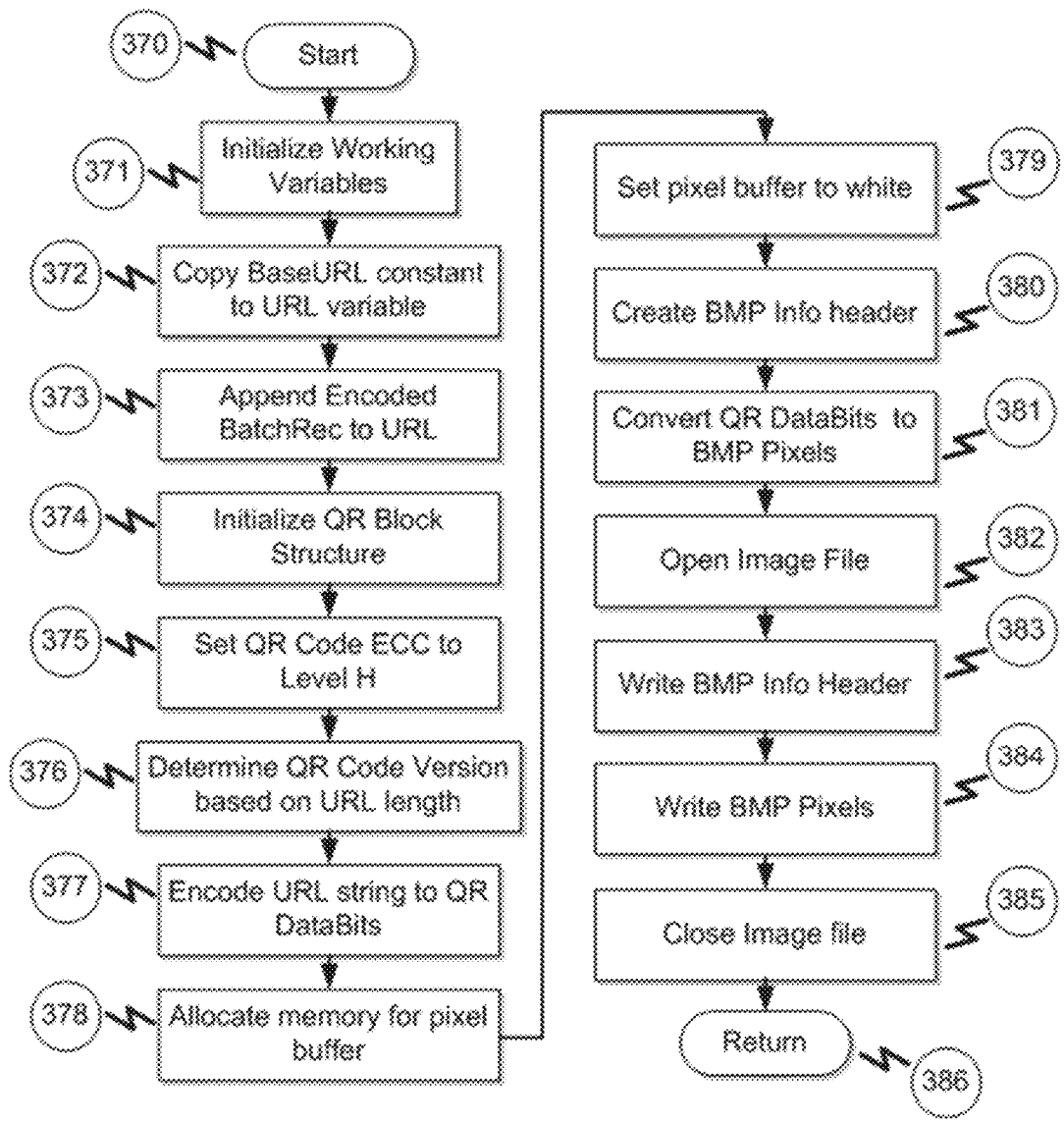
FIG. 18 illustrates a flowchart of a multi-dimensional bar code generator.

FIG. 18 represents the flowchart for the function that creates the multi-dimensional bar code. The function begins 370 by initializing the working variables 371 used by the function. The function copies the BaseURL constant to the URL variable 372 and then appends the encoded BatchRec 373 to the variable. The function initializes the QRBlock Structure 374 and sets the Error Correction Code (ECC) for the multi-dimensional bar code to level H 375, which is the highest level of error correction according to the International Standard ISO/IEC 18004 Third edition 2015-02-01. The function determines the bar code version based on the URL length 376 before encoding the URL string into QRDataBits 377. Based on the bar code version, the function allocates the appropriate amount of memory to create the pixel buffer 378. All locations in the pixel buffer are initialized to white 379. The function creates a variable to contain the precalculated bitmap (BMP) information header 380 and then proceeds to convert the QRDatabits into bitmap pixels 381. The function creates and opens an image file 382 and writes the BMP information header 383 and the BMP pixels 384 before closing the file 385 and returning to the calling function 386.

Figure 19:
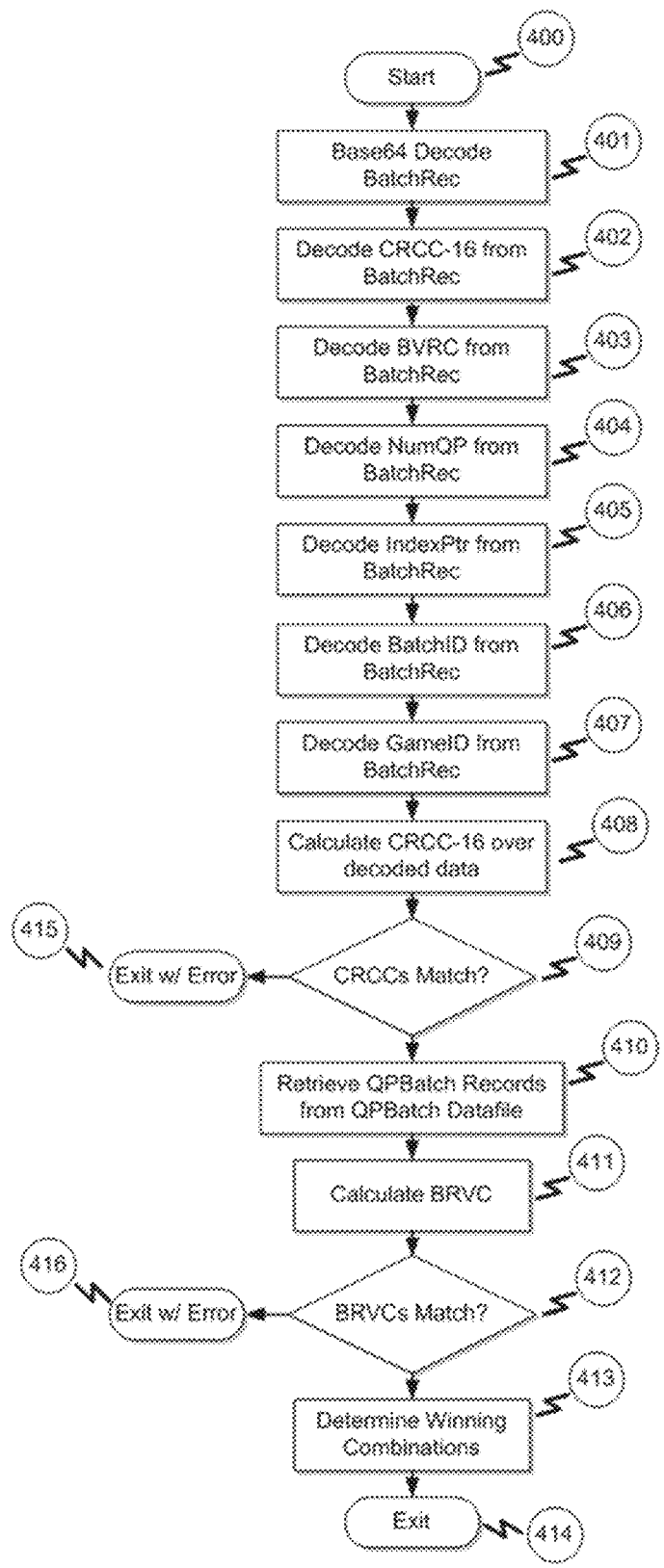
FIG. 19 illustrates a flowchart of a batch request record validator.

FIG. 19 illustrates a flow chart for The Batch Request Record Validation software. This is the main software for the Batch Request Verification System. The program starts at step 400. The function separates the encoded BRV from the URL and Base64 decodes the variable 401. The next step is to extract the CRCC-16 variable from the BRV 402 prior to extracting the BVRC variable 403. The software will extract from the BatchRec Variable, the NumQP, IndexPtr, BatchID, and GameID 404 405 406 407. After the BRV has been separated into the individual variables, the CRCC-16 is calculated 408 and compared to the extracted CRCC-16 409. If they do not match the program exits with an error 415. Otherwise, the program opens and reads in the QPBatch Record form the QPBatch DataFile 410 and calculates the BRVC from the data 411. If the calculated BRVC does not match the retrieved BRVC 412, the program exits with an error 416. If the BRVCs do match, the function calls the subfunction to determine if any winning combinations are present 413 before exiting 414.

Figure 20:
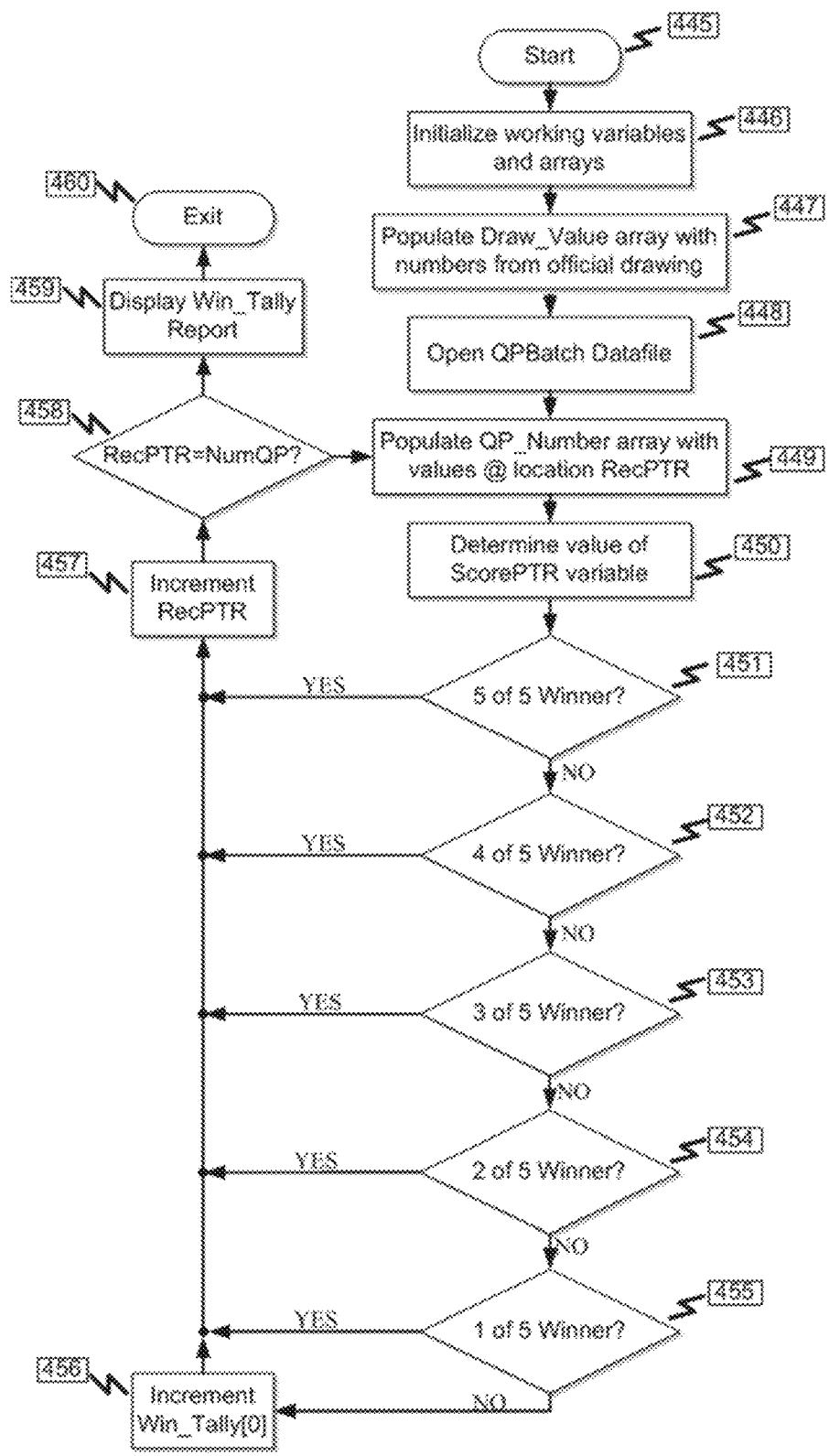
FIG. 20 illustrates a flowchart of a winner determination function.

FIG. 20 is a representation of the Determine Winners function as a flow chart. The function enters at step 445 and initializes all working variables and arrays 446. The six element draw_value array is populated with the numbers generated by the Game Results Generator 447 and sorted in ascending order (not shown). The function opens the QPBatch DataFile 448 and populates the QP Number array with the values at location RecPTR 449. The subfunction to determine the ScorePTR variable is called 450. After returning the function determines if there is a 5 of 5 winner 451, a 4 of 5 winner 452, a 3 of 5 winner 453, a 2 of 5 winner 454, or a 1 of 5 winner 455. If a winner is not determined the count at Win_Tally[0] is incremented 456. The RecPTR is incremented 457 and compared to the NumQP variable 458. If the variables are not equal, the function reads the next NRQP number combination from the QPBatch Datafile 449, otherwise the function displays the Win_tally report to the participant 459 before exiting 460.

Figure 21:
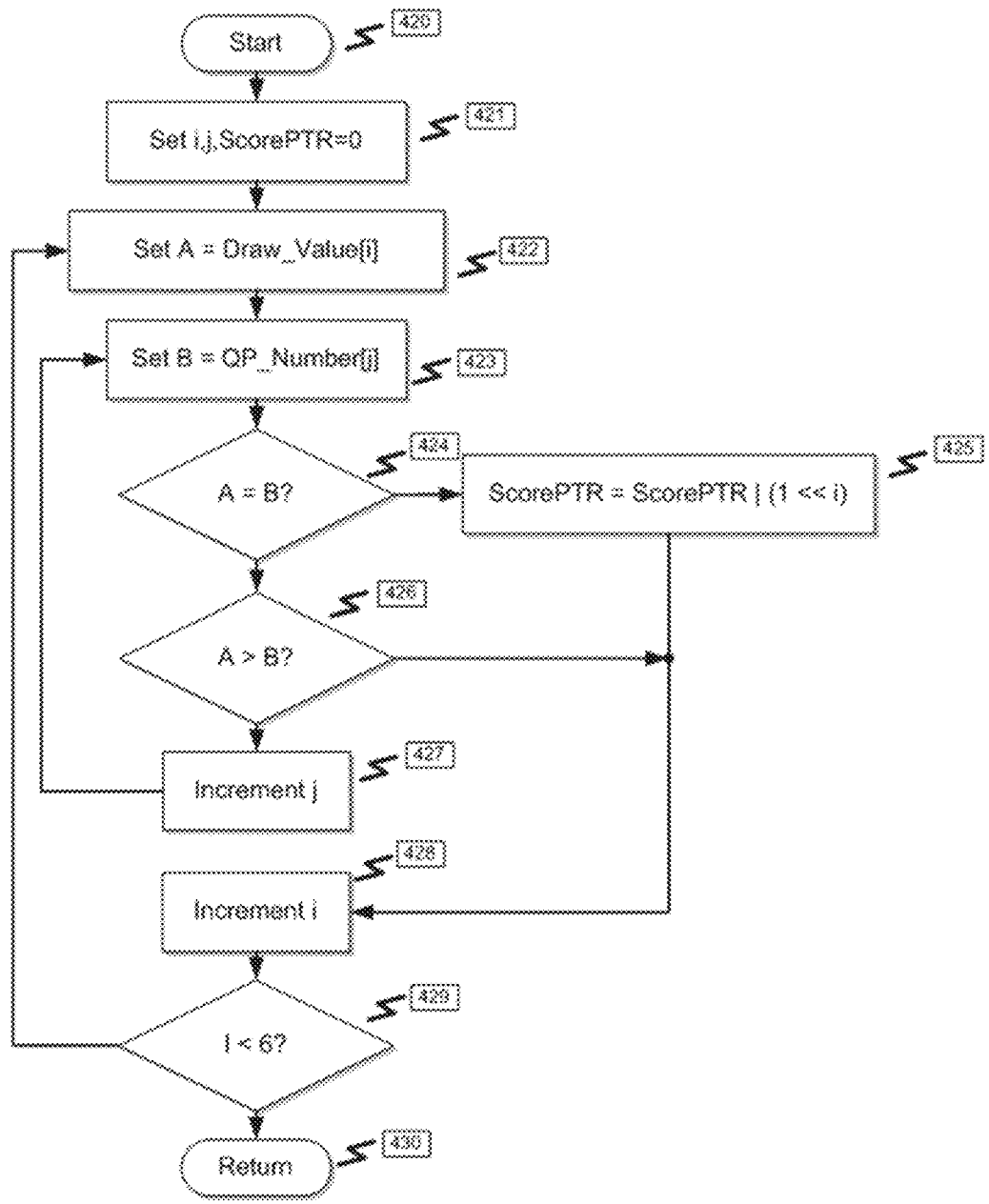
FIG. 21 illustrates a flowchart of a ScorePTR determination function.

FIG. 21 represents the method flow chart for determining the value of the ScorePTR variable. The function begins 420 and assigns the variables I, j and ScorePTR to zero 421. The function then sets the variable A to the first random number generated by the Game Result Generator and sets the variable B to the first number in the non-redundant number combination (quick pick). The variables A and B are compared and if equal 424, ScorePTR is updated by "ORing" 1 left shifted by i 425. Next it is determined if A is greater than B 426. If no, the function increments j 427 and loops to step 423. If A is greater than B the program increments i 428 before checking if i<6 429. If yes, the function returns to the calling routine 430, otherwise the program loops to step 422.

Figure 22:
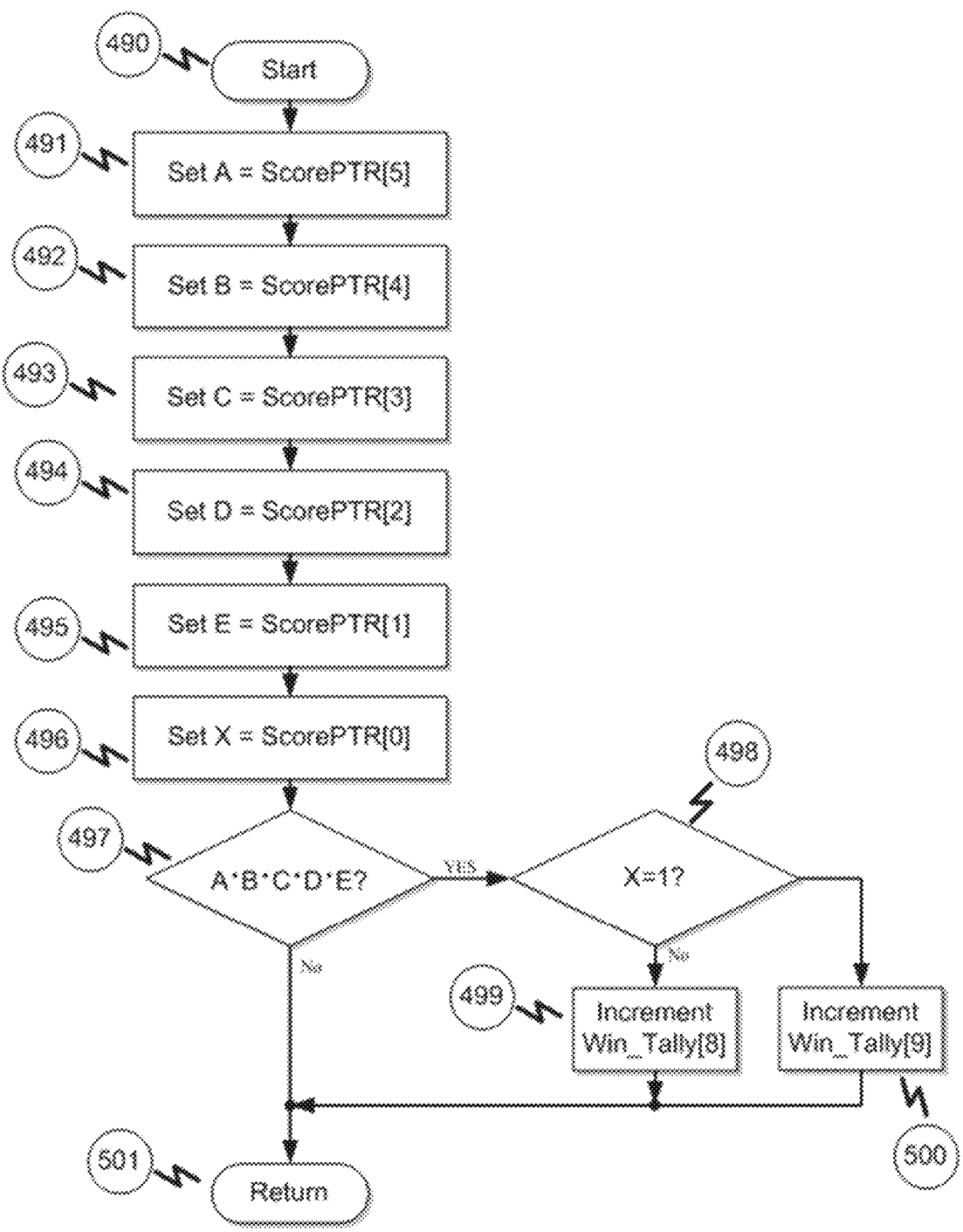
FIG. 22 illustrates a flowchart of a 5 of 5 winner determination function.

FIG. 22 illustrates the flow chart for the Determine 5 of 5 Winner method. The method enters 490 and set variables A, B, C, D, E and X respectively to the values stored in the array variable ScorePTR[5], ScorePTR[4], ScorePTR[3], ScorePTR[2], ScorePTR[1], ScorePTR[0] 491 492 493 494 495 496. The function then performs an AND operation on variables A, B, C, D, E 497. If the AND operation is true, we have a 5 of 5 winning combination so the function compares the X variable to 1 498. If X is set to 1, we have a grand prize winning combination, and the program increments the count at Win_Tally[9] 500 otherwise the count at Win_Tally[8] is incremented 499. If the AND operation 497 returns false, the function returns to the calling routine 501.

Figure 23:
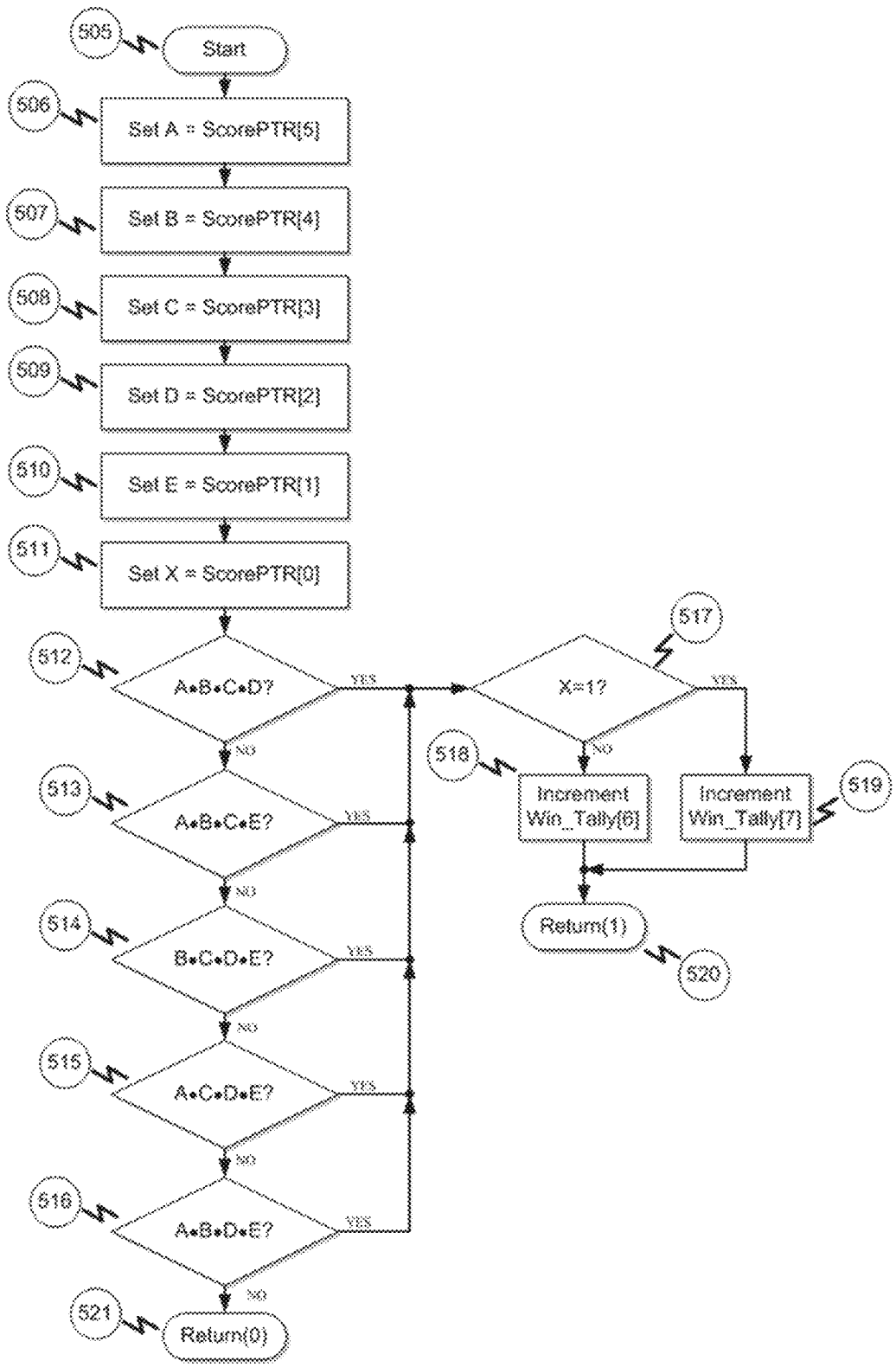
FIG. 23 illustrates a flowchart of a 4 of 5 winner determination function.

FIG. 23 illustrates the flow chart for the Determine 4 of 5 Winner method. The method enters 505 and sets variables A, B, C, D, E and X respectively to the values stored in the array variable ScorePTR[5], ScorePTR[4], ScorePTR[3], ScorePTR[2], ScorePTR[1], ScorePTR[0] 506 507 508 509 510 511. The function then performs five AND operations on various combinations of variables A, B, C, D, and E 512 513 514 515 516. If all five AND operations return false, the function returns 521 without further processing. If any of the AND operations return true, we have a 4 of 5 winning combination so the function compares the X variable to 1 517. If X is set to 1, we have a 4 of 5 plus MegaBall winning combination, and the program increments the count at Win_Tally[7] 519 otherwise the count at Win_Tally[6] is incremented 518 and the function returns 520.

Figure 24:
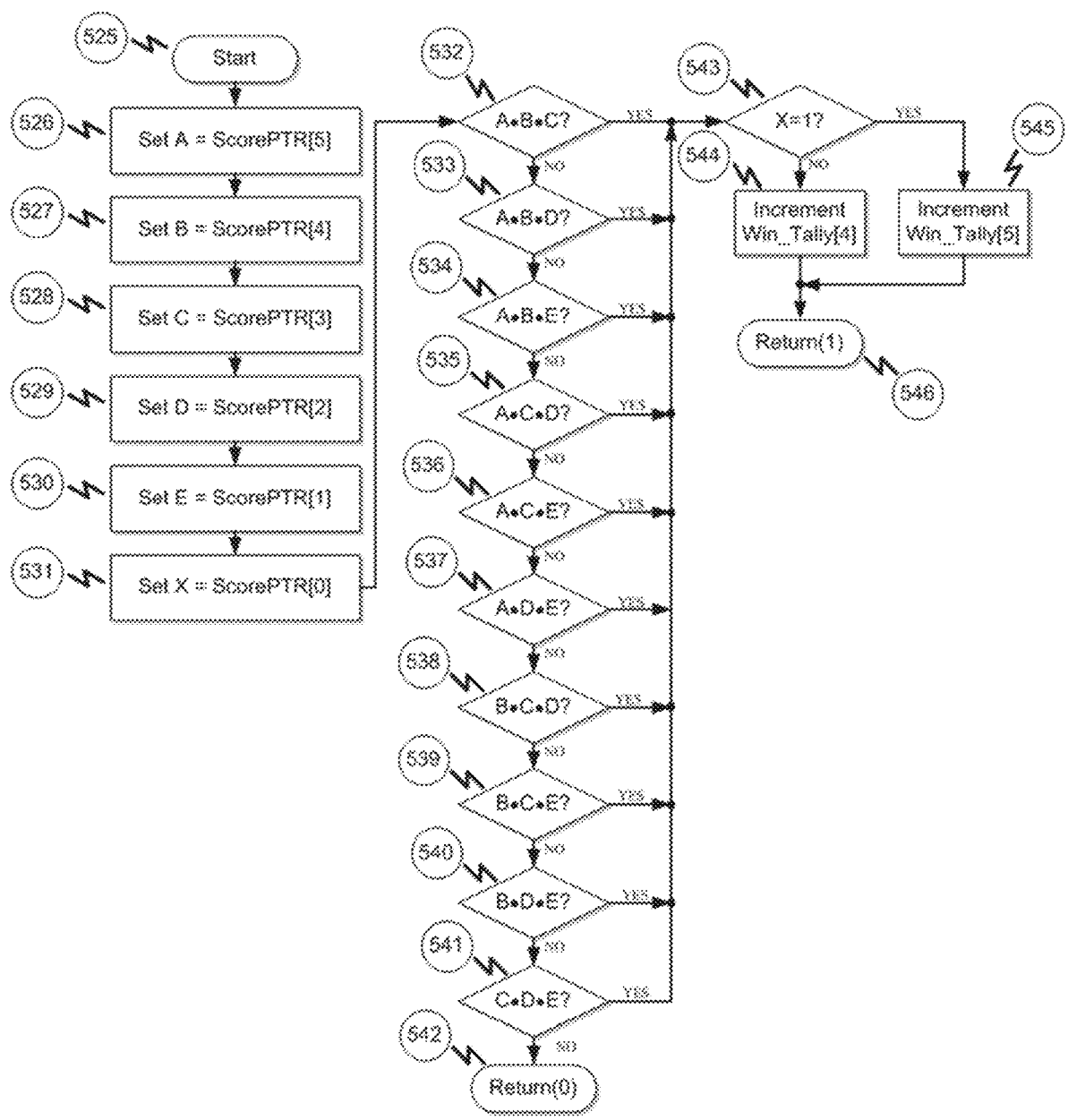
FIG. 24 illustrates a flowchart of a 3 of 5 winner determination function.

FIG. 24 illustrates the flow chart for the Determine 3 of 5 Winner method. The method enters 525 and sets variables A, B, C, D, E and X respectively to the values stored in the array variable ScorePTR[5], ScorePTR[4], ScorePTR[3], ScorePTR[2], ScorePTR[1], ScorePTR[0] 526 527 528 529 530 531. The function then performs ten AND operations on various combinations of variables A, B, C, D, and E 532 533 534 535 536 537 538 539 540 541. If all ten AND operations return false, the function returns 542 without further processing. If any of the AND operations return true, we have a 3 of 5 winning combination so the function compares the X variable to 1 543. If X is set to 1, we have a 3 of 5 plus MegaBall winning combination, and the program increments the count at Win_Tally[5] 545 otherwise the count at Win_Tally[4] is incremented 544 and the function returns 546.

Figure 25:
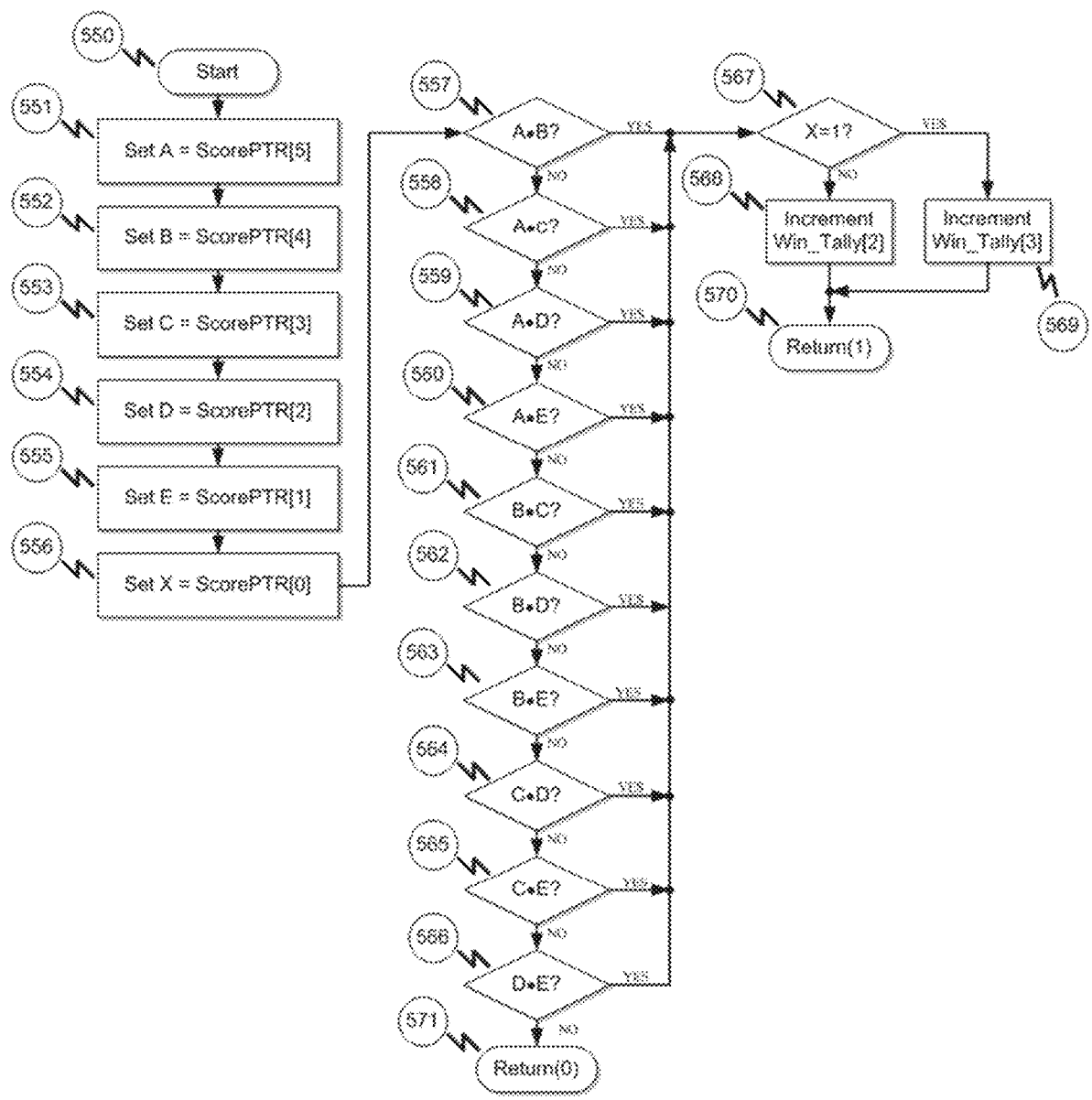
FIG. 25 illustrates a flowchart of a 2 of 5 winner determination function.

FIG. 25 illustrates the flow chart for the Determine 2 of 5 Winner method. The method enters 550 and sets variables A, B, C, D, E and X respectively to the values stored in the array variable ScorePTR[5], ScorePTR[4], ScorePTR[3], ScorePTR[2], ScorePTR[1], ScorePTR[0] 551 552 553 554 555 556. The function then performs ten AND operations on various combinations of variables A, B, C, D, and E 557 558

559 560 561 562 563 564 565 566. If all ten AND operations return false, the function returns 571 without further processing. If any of the AND operations return true, we have a 2 of 5 winning combination so the function compares the X variable to 1 567. If X is set to 1, we have a 2 of 5 plus MegaBall winning combination, and the program increments the count at Win_Tally[3] 569 otherwise the count at Win_Tally[2] is incremented 568 and the function returns 570.

Figure 26:
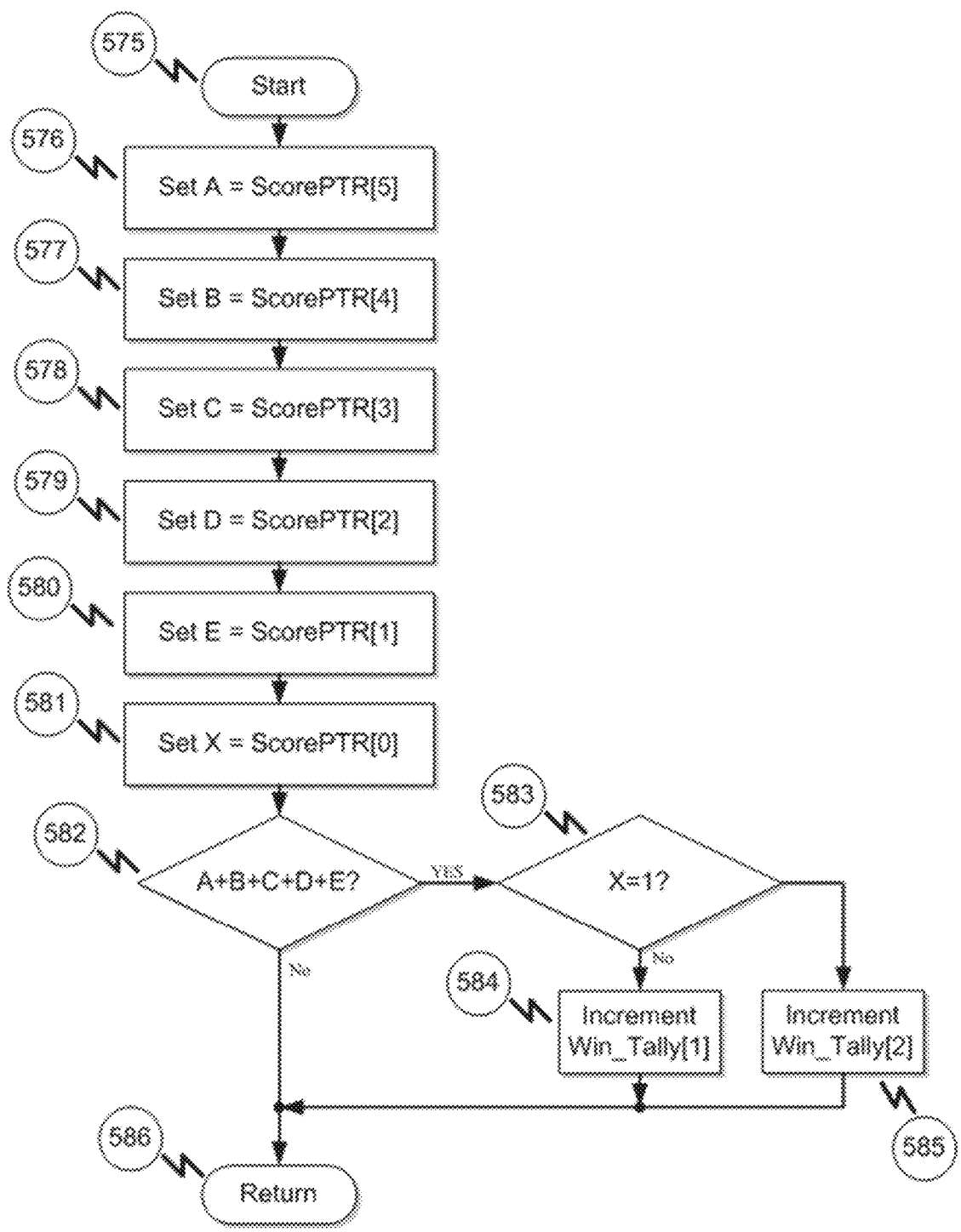
FIG. 26 illustrates a flowchart of a 1 of 5 winner determination function.

FIG. 26 illustrates the flow chart for the Determine 1 of 5 Winner method. The method enters 575 and sets variables A, B, C, D, E and X respectively to the values stored in the array variable ScorePTR[5], ScorePTR[4], ScorePTR[3], ScorePTR[2], ScorePTR[1], ScorePTR[0] 576 577 578 579 580 581. The function then performs on OR operations on variables A, B, C, D, and E 582. If the OR operations return false, the function returns 586 without further processing. If the OR operation returns true, we have a 1 of 5 winning combination so the function compares the X variable to 1 583. If X is set to 1, we have a 1 of 5 plus MegaBall winning combination, and the program increments the count at Win_Tally[2] 585 otherwise the count at Win_Tally[1] is incremented 584 and the function returns 586.

Figure 27:
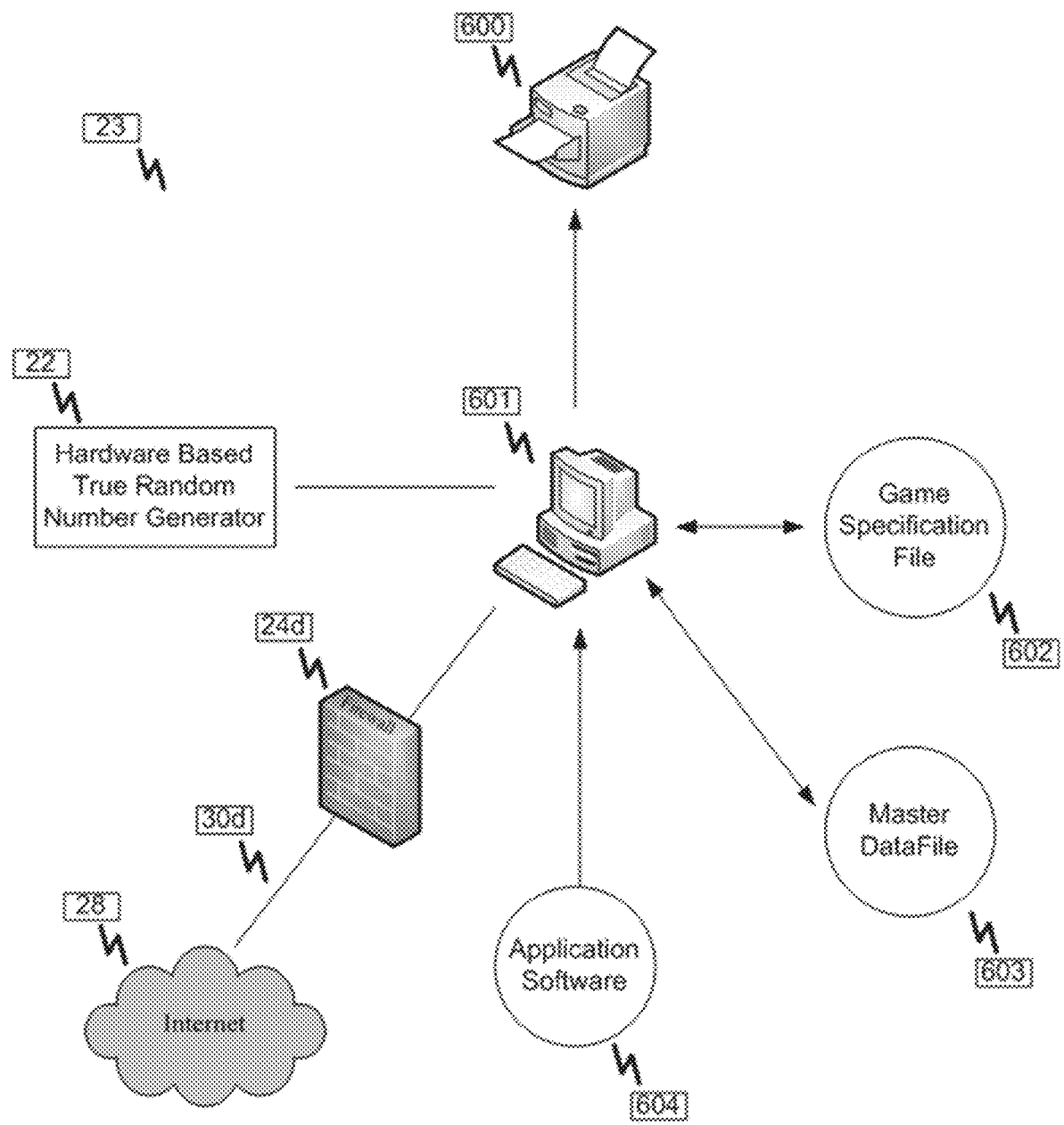
FIG. 27 illustrates an example of a non-redundant quick pick master datafile generation system.

FIG. 27 illustrates an example of a NRQP Master DataFile Generation system 23. The NRQP Master DataFile Generation system 23 is illustrated simply for exemplary purposes and is not intended to be limiting. A computing system 601 is connected to the Internet 28 via secure connection 30*d* through a security firewall 24*d* and is also connected to a printer 600. The computing system 601 includes a hardware based true random number generator 22, as well as a game specification file 602, a Master DataFile 603, and custom application software 604.

Figure 28:
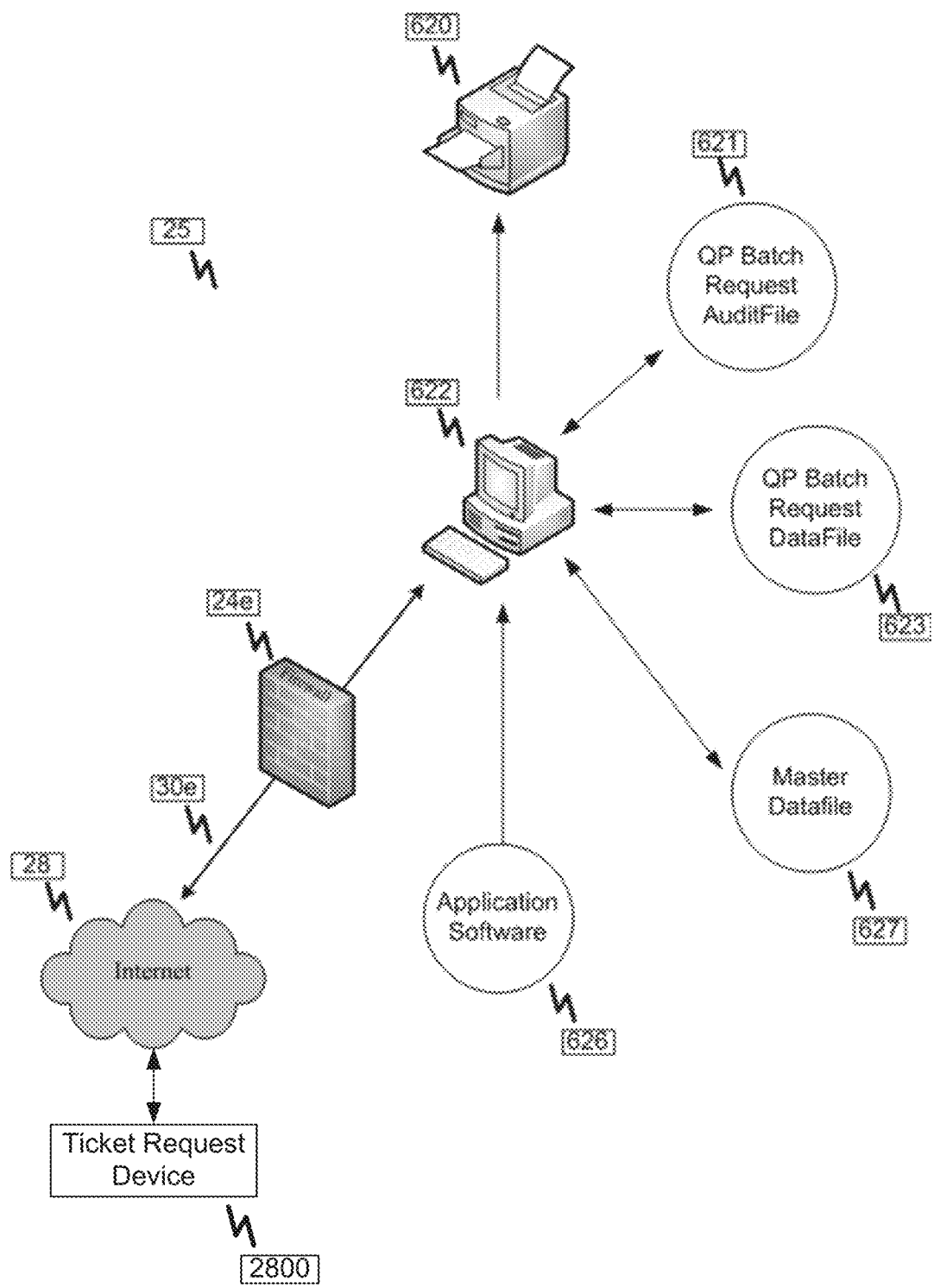
FIG. 28 illustrates an example of a quick pick batch request system.

FIG. 28 illustrates an example of a NRQP QP Batch Request system 25. The NRQP QP Batch Request system 25 is illustrated simply for exemplary purposes and is not intended to be limiting. A computing system 622 is connected to the Internet 28 via a secure connection 30*e* through a security firewall 24*e* and is also connected to a printer 620. The computing system 622 includes a QP Batch Request AuditFile 621, a QP Batch Request DataFile 623 as well as a Master DataFile 627, and custom application software 626.

In one non-limiting example, the computing system 622 may be a computing server and may be implemented as a dedicated server or as part of a cloud computing platform. The server may be implemented in a centralized or distributed environment. Also, the server may be implemented as a single server or a cluster of servers. As an example, the server may be a computer having (or a cluster of computers each having) one or more processors with associated transitory and/or non-transitory memory storage devices. The processor may be, e.g., an Intel processor, an AMD processor, or the like, running an appropriate operating system such as, e.g., Windows 2008 R2, Windows Server 2012 R2, Linux operating system, and etc.

Ticket request device 2800 shown in FIG. 28 may be one or more of, e.g., a retail point of sales lottery ticking terminal, a PC, a laptop, a tablet, or a cellphone. Other specific examples of such devices may be, e.g., a Microsoft Windows OS based phone/computer/tablet, an Android phone/tablet/computer, an Apple IOS phone/tablet/computer, or the like.

Figure 29:
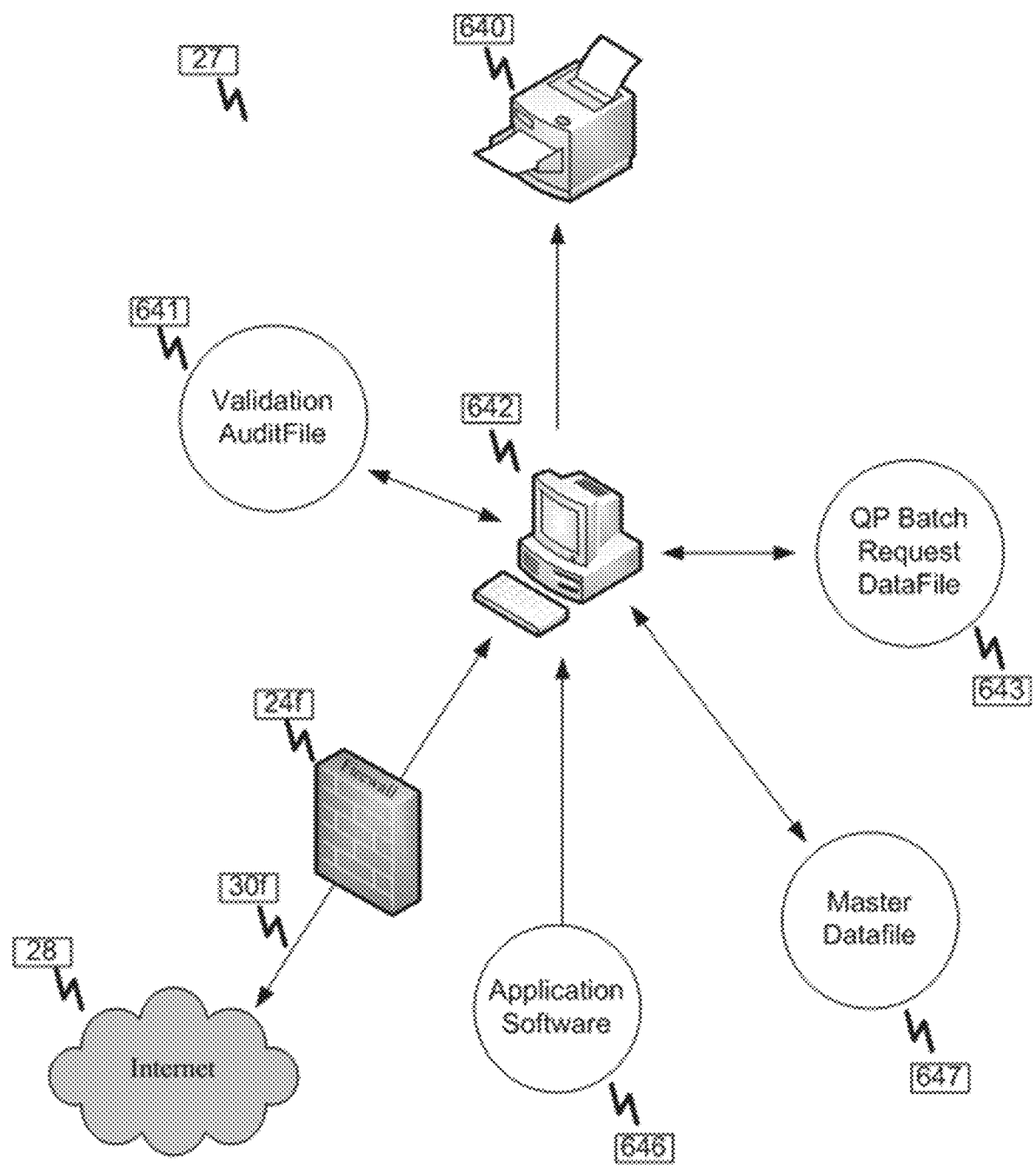
FIG. 29 illustrates an example of a quick pick batch verification system.

FIG. 29 illustrates an example of a NRQP QP Batch Verification system 27. The NRQP QP Batch Verification system 27 is illustrated simply for exemplary purposes and is not intended to be limiting. A computing system 642 is connected to the Internet 28 via secure connection 30*f* through a security firewall 24*f* and is also connected to a printer 640. The computing system 642 includes a QP Batch Request DataFile 643 as well as a Master DataFile 647, Validation AuditFile 641, and custom application software 646.

Figure 30:
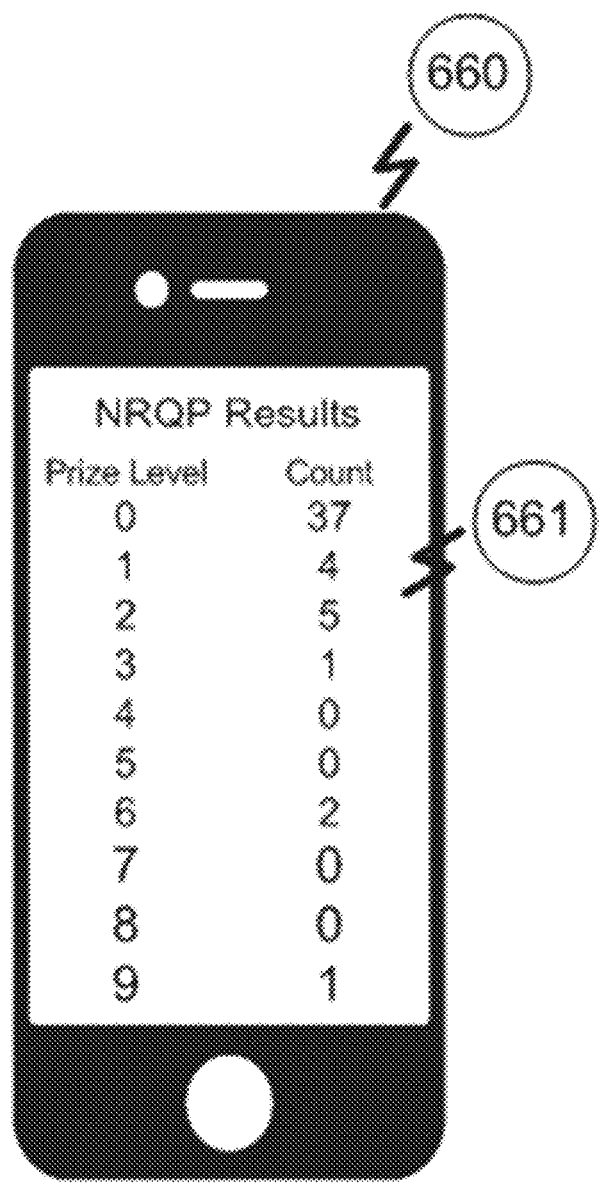
FIG. 30 illustrates an example of a smart device showing the quick pick batch verification results.

FIG. 30 illustrates an example of a smart device 660 displaying the Win_Tally Report 661. The smart device 660 is illustrated simply for exemplary purposes and is not intended to be limiting. The Win_Tally report 661 is informing the participant of the outcome of the NRQP Batch Request Verification process. In this example the participant's batch of NRQP number combinations when compared to the random numbers generated by the Game Results Generator has produced 37 non-winners, 4 level 1 winners, 5 level 2 winners, 1 level 3 winner, 2 level 6 winners. The Win_Tally report also indicates the participant has been the sole winner of the grand prize with a level 9 winning combination.

Figure 31:
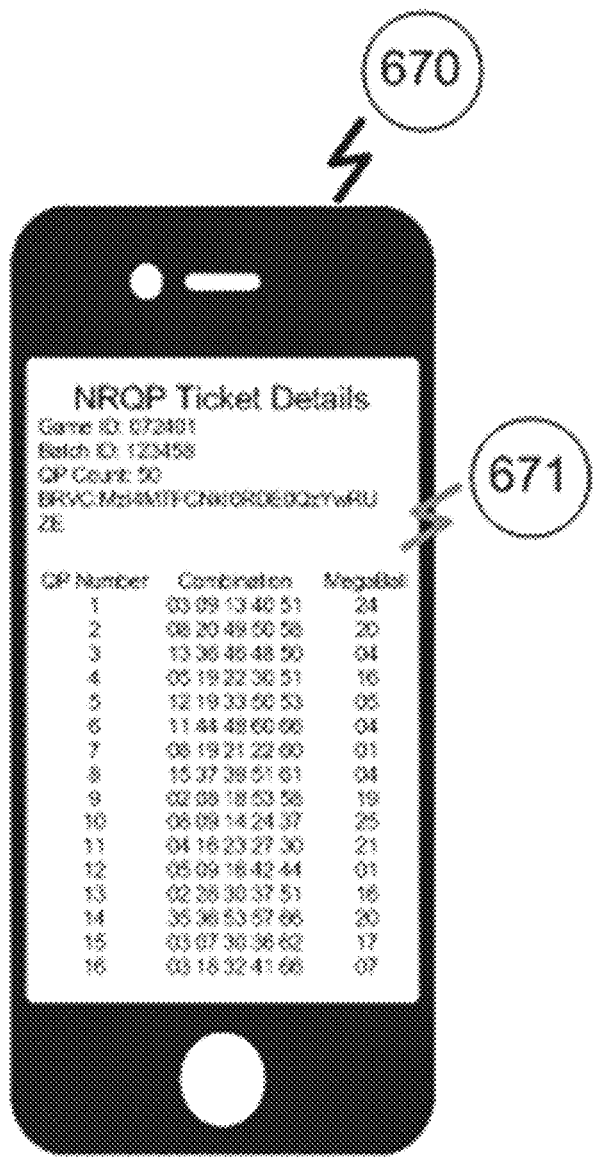
FIG. 31 illustrates an example of a smart device displaying the details of a non-redundant quick pick ticket.

FIG. 31 illustrates an example of a smart device 670 displaying the participants NRQP Ticket details 671. The smart device 670 is illustrated simply for exemplary purposes and is not intended to be limiting. The NRQP Ticket Details 671 is informing the participant of the various information associated with their ticket. For example, the screen displays the Game ID number (072101), the Batch ID number (123456), the number of NRQP number combinations associated with this ticket (50) and the Batch Request Verification Code. In addition, each individual NRQP number combinations are displayed on the screen. The participant would be able to scroll the screen up and down to view all fifty number combinations.

Figure 32:
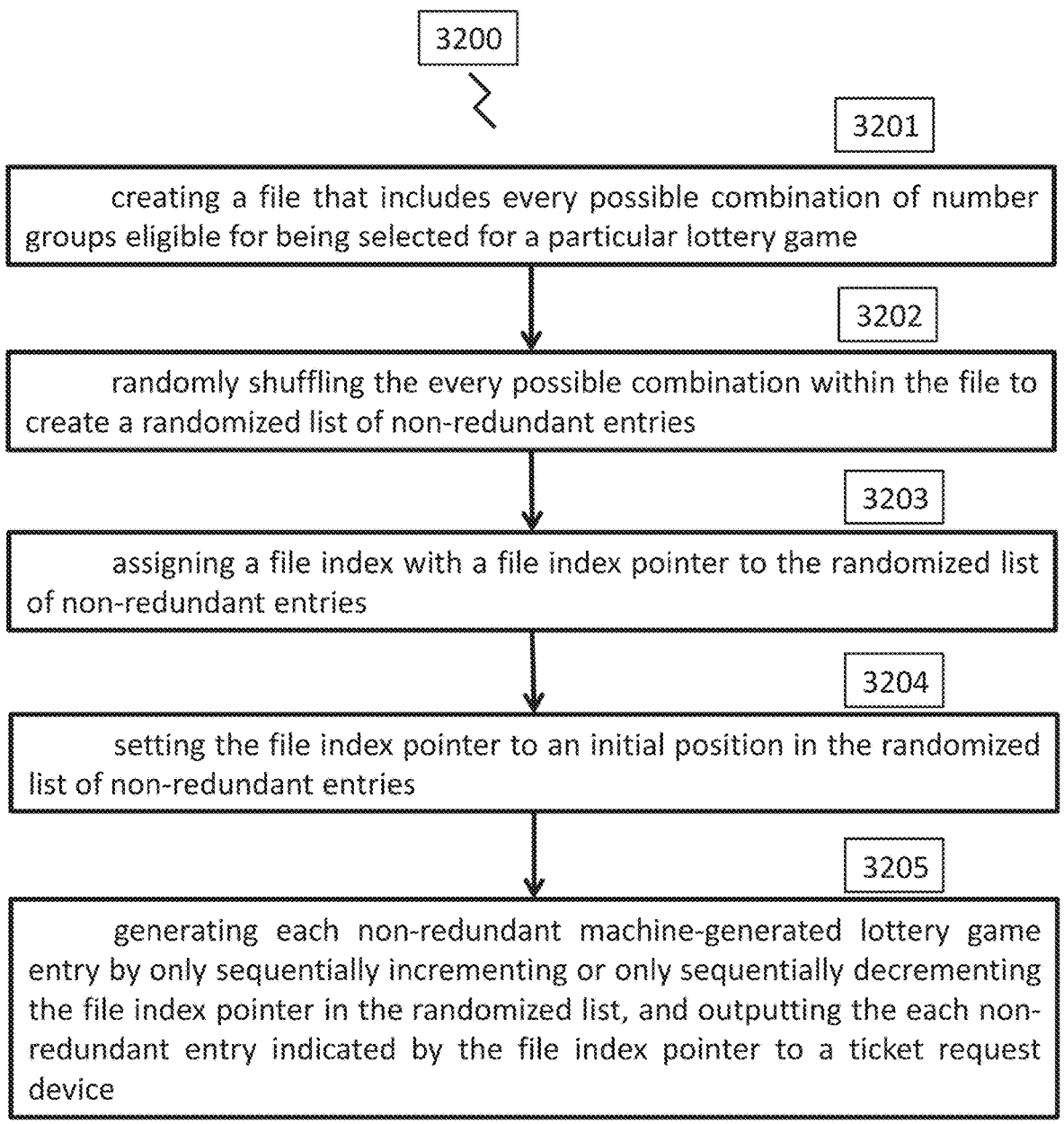
FIG. 32 illustrates another exemplary process.

FIG. 32 illustrates another exemplary process 3200 for generating non-redundant machine-generated quick pick lottery game entries, performed by, e.g., a computing system 622 described previously in connection with, e.g., FIG. 28. At 3201, a computer file is created that includes every possible combination of number groups eligible for being selected for a particular lottery game. As an example, for a simple lottery game having a number range from 0 to 2, and a number group number of 2 (including the bonus number group), the list of all possible combinations for the number groups would be 3 entries, i.e., ([0,1]; [0,2]; [1,2]).

At 3202, the every possible combination within the file is randomly shuffled to create a randomized list of non-redundant entries. As described above, in one embodiment, the randomly shuffling is based on the Durstenfeld algorithm utilizing a random number generator. In another embodiment, the random number generator is based on a hardware based true random number generator. As an example, the above list of all possible combinations for the number groups once randomly shuffled may have become a randomized list, such as, e.g., ([0,2]; [1,2]; [0,1]), ([0,1]; [1,2]; [0,2]), ([0,1]; [0,2]; [1,2]), and etc., depending on the outcome of the random shuffling.

At 3203, a file index with a file index pointer is assigned to the randomized list of non-redundant entries. At 3204, the file index pointer is set to an initial position in the randomized list of non-redundant entries. One example of such a file index with an index pointer for the above first example of the randomized list of non-redundant entries may be represented in bold as ([0,2](i=1); [1,2] (i=2); [0,1] (i=3)). In this example, the index starts at 1 (i.e., the lowest index pointer number) and ends at 3 (i.e., the highest index pointer number) for the total of 3 possible combinations of entries in the list. In addition, the initial position of the index pointer in this example starts at the entry number one in the randomized list. Of course, many other indexing implementations and initial positioning are possible. For example, in another non-limiting example, the index pointers have the range from 0 to 2 and the initial position is pointed to entry number 3 of list instead, i.e.: ([0,2] (i=3); [1,2] (i=2); [0,1] (i=0)). In another example, when the index pointer is to be decremented as to be described below, the initial position will be at the highest index pointer value (i.e., (i=3) in the first example, and (i=2) in the second example).

At step 3205, each non-redundant machine-generated lottery game entry is generated by only sequentially incrementing or only sequentially decrementing the file index pointer in the randomized list, and outputting the each non-redundant entry indicated by the file index pointer. That is, when a respective quick pick game ticket is requested, the entry in the randomized list pointed to by the current index pointer will be generated and outputted as the requested ticket number combination to the ticket request device (e.g., 2800 in FIG. 28).

Accordingly, in one embodiment, the index pointer will only be sequentially incremented to generate the next ticket when another ticket is requested. That is, using the previous example of the randomized list being: ([0,2] (i=1); [1,2] (i=2); [0,1] (i=3)), the sequence of the incrementally generated list of all the quick pick tickets in this exemplary embodiment will be: ([0,2]; [1,2]; [0,1]).

In another embodiment, the index pointer will only be sequentially decremented for generating the next ticket when requested. Using the same previous examples of ([0,2] (i=1); [1,2](i=2); [0,1] (i=3)), the sequence of the decrementally generated list of all the quick pick tickets in this exemplary embodiment will be: ([0,1]; [1,2]; [0,2]).

In another aspect of present exemplary embodiments, when the number of entries in the randomized list of non-redundant entries has been generated, no more entries will be generated if another quick pick game ticket is requested. Accordingly, present embodiments advantageously ensure that the maximum number of quick pick tickets are automatically and efficiently generated when a respective ticket is requested and that only one grand prize will be rewarded for a particular lottery game.

The embodiments described may be carried out by computer software implemented by one or more processors, or other hardware, or by a combination of hardware and software. As a non-limiting example, the embodiments may be implemented by one or more integrated circuits. A computer memory in the embodiments may be of any type appropriate to the technical environment and may be implemented using any appropriate data storage technology, including non-transitory or transitory storage, such as optical memory devices, magnetic memory devices, semiconductor-based memory devices, fixed memory, and removable memory, as non-limiting examples. A processor may be of any type appropriate to the technical environment, and may encompass one or more of microprocessors, general purpose computers, special purpose computers, and processors based on a multi-core architecture, centralized or non-centralized as non-limiting examples.

We describe a number of embodiments. Features of these embodiments can be provided alone or in any combination.

The invention claimed is:

1. A system for generating and displaying non-redundant machine-generated quick pick lottery game entries, comprising:
    a server;
    a device located remotely to the server;
    wherein the server comprising:
        at least a memory;
        one or more processors configured to:
            create a computer file that includes every possible combination of number groups eligible for being selected for a particular lottery game;
            randomly shuffle the every possible combination within the computer file to create a randomized list of non-redundant entries;
            assign a computer file index with a computer file index pointer to the randomized list of non-redundant entries;
            set the computer file index pointer to an initial position in the randomized list of non-redundant entries;
            generate each non-redundant machine-generated lottery game entry by only sequentially incrementing or only sequentially decrementing the computer file index pointer in the randomized list; and
            transmit the each non-redundant entry indicated by the computer file index pointer to the device located remotely to the server; and
    wherein the device located remotely to the server comprising:
        a display; and
        is configured to display the each non-redundant entry transmitted from the server; and
    wherein the randomly shuffling is done utilizing a hardware based true random number generator.

2. The system of claim 1 wherein the each non-redundant machine-generated lottery game entry is sequentially generated by the server when a respective quick pick game ticket is requested by the device located remotely to the server.

3. The system of claim 2, wherein when the number of entries in the randomized list of non-redundant entries has been generated, no more entries will be generated if another quick pick game ticket is requested.

4. The system of claim 3 wherein the request is made using an app on the device located remotely to the server.

5. The system of claim 3, wherein the randomly shuffling is based on the Durstenfeld algorithm utilizing a random number generator located on the server.

6. The system of claim 3 wherein the each non-redundant machine-generated lottery game entry comprises a main number group and a bonus number group.

7. A method, performed by a system comprising a server and a device located remotely to the server, for generating and displaying non-redundant machine-generated quick pick lottery game entries, comprising:
    creating, by the server, a computer file that includes every possible combination of number groups eligible for being selected for a particular lottery game;
    randomly shuffling, by the server, the every possible combination within the computer file to create a randomized list of non-redundant entries;
    assigning, by the server, a computer file index with a computer file index pointer to the randomized list of non-redundant entries;
    setting, by the server, the file index pointer to an initial position in the randomized list of non-redundant entries;
    generating, by the server, each non-redundant machine-generated lottery game entry by only sequentially incrementing or only sequentially decrementing the file index pointer in the randomized list; and
    transmitting, by the server, the each non-redundant entry indicated by the computer file index pointer to the device located remotely to the server; and displaying on a display, by the device located remotely to the server, the each non-redundant entry transmitted from the server and wherein the randomly shuffling is done utilizing a hardware based true random number generator.

8. The method of claim 7 wherein the each non-redundant machine-generated lottery game entry is sequentially generated by the server when a respective quick pick game ticket is requested by the device located remotely to the server.

9. The method of claim 8, wherein when the number of entries in the randomized list of non-redundant entries has been generated, no more entries will be generated if another quick pick game ticket is requested.

10. The method of claim 9 wherein the request is made using an app on the device located remotely to the server.

11. The method of claim 9, wherein the randomly shuffling is based on the Durstenfeld algorithm utilizing a random number generator located on the server.

12. The method of claim 9 wherein the each non-redundant machine-generated lottery game entry comprises a main number group and a bonus number group.

13. A computer program product for generating, by a server, non-redundant machine-generated quick pick lottery game entries to be displayed by a device located remotely to the server, the computer program product comprising computing instructions stored on a non-transitory computer storage medium and when the computing instructions are executed by one or more processors, configure the one or more processors to:

create, by the server, a computer file that includes every possible combination of number groups eligible for being selected for a particular lottery game;

randomly shuffle, by the server, the every possible combination within the computer file to create a randomized list of non-redundant entries;

assign, by the server, a computer file index with a computer file index pointer to the randomized list of non-redundant entries;

set, by the server, the computer file index pointer to an initial position in the randomized list of non-redundant entries; and generate, by the server, each non-redundant machine-generated lottery game entry by only sequentially incrementing or only sequentially decrementing the computer file index pointer in the randomized list; and transmit, by the server, the each non-redundant entry indicated by the computer file index pointer to the device located remotely to the server; and wherein the each non-redundant entry transmitted from the server is to be displayed, by the device located remotely to the server, on a display; and wherein the randomly shuffling is done utilizing a hardware based true random number generator.

14. The computer program product of claim 13 wherein the each non-redundant machine-generated lottery game entry is sequentially generated by the server when a respective quick pick game ticket is requested by the device located remotely to the server.

15. The computer program product of claim 14, wherein when the number of entries in the randomized list of non-redundant entries has been generated, no more entries will be generated if another quick pick game ticket is requested.

16. The computer program product of claim 15 wherein the request is made using an app on the device located remotely to the server.

17. The computer program product of claim 13 wherein the each non-redundant machine-generated lottery game entry comprises a main number group and a bonus number group.

18. An apparatus for generating non-redundant machine-generated quick pick lottery game entries, comprising:

at least a memory;

a hardware based true random number generator;

one or more processors configured to:

create a computer file that includes every possible combination of number groups eligible for being selected for a particular lottery game;

randomly shuffle, based on a random number generated by the hardware based true random number generator, the every possible combination within the computer file to create a randomized list of non-redundant entries;

assign a computer file index with a computer file index pointer to the randomized list of non-redundant entries;

set the computer file index pointer to an initial position in the randomized list of non-redundant entries;

generate each non-redundant machine-generated lottery game entry by only sequentially incrementing or only sequentially decrementing the computer file index pointer in the randomized list; and output the each non-redundant entry indicated by the computer file index pointer.

\* \* \* \* \*